(12) United States Patent
Shepard

(10) Patent No.: US 9,926,009 B2
(45) Date of Patent: Mar. 27, 2018

(54) PORTABLE TRAILER GUIDANCE SYSTEM

(71) Applicant: Daniel Robert Shepard, North Hampton, NH (US)

(72) Inventor: Daniel Robert Shepard, North Hampton, NH (US)

( * ) Notice: Subject to any disclaimer, the term of this patent is extended or adjusted under 35 U.S.C. 154(b) by 97 days.

(21) Appl. No.: 14/791,283

(22) Filed: Jul. 3, 2015

(65) Prior Publication Data

US 2017/0008559 A1 Jan. 12, 2017

Related U.S. Application Data

(60) Provisional application No. 62/020,526, filed on Jul. 3, 2014, provisional application No. 62/117,433, filed on Feb. 17, 2015.

(51) Int. Cl.
| | |
|---|---|
| *B62D 1/24* | (2006.01) |
| *B62D 13/06* | (2006.01) |
| *H04W 4/00* | (2018.01) |
| *B62D 1/04* | (2006.01) |
| *B62D 15/02* | (2006.01) |
| *B60D 1/24* | (2006.01) |
| *B60D 1/62* | (2006.01) |

(52) U.S. Cl.
CPC ............ *B62D 13/06* (2013.01); *B60D 1/245* (2013.01); *B60D 1/62* (2013.01); *B62D 1/046* (2013.01); *B62D 15/027* (2013.01); *H04W 4/008* (2013.01)

(58) Field of Classification Search
None
See application file for complete search history.

(56) References Cited

U.S. PATENT DOCUMENTS

| | | | | |
|---|---|---|---|---|
| 5,001,637 | A * | 3/1991 | Shiraishi | B62D 15/02 701/41 |
| 5,572,119 | A * | 11/1996 | Taylor | F16C 32/0446 174/261 |
| 2004/0215374 | A1* | 10/2004 | Shepard | B60D 1/58 701/1 |
| 2005/0087121 | A1* | 4/2005 | Brown | B62D 15/0205 116/31 |
| 2006/0190147 | A1* | 8/2006 | Lee | B62D 15/0275 701/26 |
| 2011/0001825 | A1* | 1/2011 | Hahn | B60R 1/00 348/148 |
| 2011/0190982 | A1* | 8/2011 | Lavoie | B62D 15/021 701/41 |
| 2012/0174669 | A1* | 7/2012 | Snider | G01P 1/023 73/488 |
| 2012/0271514 | A1* | 10/2012 | Lavoie | B60W 30/18036 701/42 |
| 2012/0271515 | A1* | 10/2012 | Rhode | B62D 1/22 701/42 |
| 2013/0158863 | A1* | 6/2013 | Skvarce | G08G 1/168 701/428 |
| 2014/0085472 | A1* | 3/2014 | Lu | B60R 1/002 348/148 |

(Continued)

*Primary Examiner* — Navid Ziaeianmehdizadeh

(57) ABSTRACT

Trailer guidance systems require sensors for detecting the hitch angle and the turning radius and output means for displaying the intended trailer destination. However, most vehicles do not have integral turning sensors and most trailers and/or hitches do not have integral hitch angle sensors. The present invention is a system for guiding a trailer while backing that can easily be installed or removed.

16 Claims, 20 Drawing Sheets

(56) References Cited

U.S. PATENT DOCUMENTS

| | | | | |
|---|---|---|---|---|
| 2014/0188344 A1* | 7/2014 | Lavoie | ........... | B60W 30/00 701/41 |
| 2014/0218522 A1* | 8/2014 | Lavoie | ........... | G08G 1/0962 348/148 |
| 2014/0229070 A1* | 8/2014 | Witting | ........... | B62D 13/06 701/42 |
| 2014/0303847 A1* | 10/2014 | Lavoie | ........... | B62D 15/0275 701/41 |
| 2014/0303849 A1* | 10/2014 | Hafner | ........... | B62D 13/06 701/42 |
| 2015/0251693 A1* | 9/2015 | Lavoie | ........... | B62D 13/06 701/41 |
| 2015/0251697 A1* | 9/2015 | Lavoie | ........... | B62D 13/06 701/523 |
| 2017/0008563 A1* | 1/2017 | Popken | ........... | G08G 1/168 |

\* cited by examiner

PORTABLE TRAILER GUIDANCE SYSTEM

CROSS-REFERENCE TO RELATED APPLICATION

This Utility Patent Application claims priority of Provisional Patent Application 62/020,526, by Shepard titled "Portable Trailer Guidance System" that was filed on Jul. 3, 2014 and of Provisional Patent Application 62/117,433, by Shepard titled "Dual Purpose Hitch Sensor" that was filed on Feb. 17, 2015 and those applications are incorporated herein in their entireties by reference.

TECHNICAL FIELD

In various embodiments, the present invention relates to systems for guiding a trailer while backing and, in particular, the present invention relates to systems for guiding a trailer while backing that can easily be installed or removed.

BACKGROUND

Trailers have been around for many years, yet every summer and winter one can observe the owners of boats and snowmobiles, respectively, backing up those devices on trailers with great difficulty. The problem arises from the fact that a trailer being backed-up is an inherently unstable system. A trailer being pushed wants to turn around and be pulled (i.e., to jackknife) instead. To compensate for this instability, the driver must skillfully alternate the direction of his steering so as to cause the trailer to want to turn around and be pulled from opposite sides thereby repeatedly crossing the centerline of the pushing vehicle. Various innovations have been introduced to address this problem in whole or in part. Prior art reveals several attempts to address the problems associated with backing a trailer. The simplest solutions address parts of the problem ranging from ways of sensing the angle of the hitch (see: Kollitz, U.S. Pat. No. 4,122,390), to sensing and displaying the angle of the hitch (see: Gavit, U.S. Pat. No. 3,833,928), to sounding an alarm when a jackknife condition exists or is imminent (see: Kimmel, U.S. Pat. No. 4,040,006). While these solutions are helpful, they only each address a part of the backing problem. Shepard in his U.S. Pat. No. 7,715,953 (the '953 patent) teaches a complete working system. However, in that teaching, some new needs arise that are addressed by the teaching of the present invention, such as how to install a complete working system as an after market product that can easily be installed or removed. The present invention also teaches a sensor for measuring the angle formed between the centerline of the vehicle and the centerline of the trailer (i.e., the hitch angle sensor or, as it is sometimes also known, the articulation angle sensor) such that it does not interfere or collide with the trailer tongue or any other parts of the hitching system that can easily be installed or removed. In particular, an angle sensor is needed that can get its measurement in-line with the axis of rotation of the trailer tongue upon the hitch ball (i.e., to measure the articulation angle of this hitch joint) without actually being located at that axis of rotation. This hitch angle sensor, in particular, must be designed not to be damaged either during hitching up a trailer (due to a collision between the hitch and sensor with a part of the trailer) nor while towing on the highway (due to kicked up debris). The present invention also teaches a steering sensor that does not interfere with the driver's ability to steer and that also can easily be installed or removed.

Trailer guidance systems such as the system disclosed in the '953 patent require sensors for detecting the hitch angle and the turning radius and output means for displaying the intended trailer destination. However, most vehicles do not have integral turning sensors and most trailers and/or hitches do not have integral hitch angle sensors. In particular, the turning radius must typically be calculated from a measurement of a portion of the steering mechanism of the vehicle thereby requiring a sensor to take that measurement. One way to determine the turning radius (as is disclosed in the '953 patent) is to sense the angular deflection to the front wheels of the vehicle away from the straight line position (i.e., the steering angle) and use that angular value (along with the vehicle's wheel base) to compute the turning radius. Another way to determine the turning radius (as disclosed herein) is to take a measurement of the steering mechanism by sensing the angular position of the steering wheel, compare that measurement to a reference position (such as the steering wheel angle when the vehicle is steered to travel in a straight line), compute the difference between these two angles, translate the difference into an angular deflection to the wheels of the vehicle away from the straight line position (i.e., the steering angle), and (again, as is disclosed in the '953 patent) compute the turning radius. Likewise, a hitch sensor must measure the angle formed between the centerline of the vehicle and the centerline of the trailer (i.e., the hitch angle).

SUMMARY

The present invention relates to systems for guiding a trailer while backing that can easily be installed or removed. The present invention is a means and a method for sensing both the turning radius (or for sensing a value from which the turning radius can be computed) and the hitch angle. The present invention will be useful for operation with trailer backing systems when (i) the vehicle involved does not have an integral turning sensor and the trailer and/or hitch involved does not have an integral hitch angle sensor, (ii) the vehicle involved has a built in turning sensor but the trailer and/or hitch involved does not have an integral hitch angle sensor, and (iii) the vehicle involved does not have an integral turning sensor but the trailer and/or hitch involved has a built in hitch angle sensor. In each of these three sensor scenarios, the present invention will also be useful in presenting the intended direction of the trailer by providing a means and method to temporarily or permanently provide a display means to indicate the trailer's direction. The hitch angle and turning radius sensors will also be useful in other trailer guidance systems including, but not limited to, systems whereby the vehicle's steering is servo controlled or otherwise fully or partially automated.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention. In the following description, various embodiments of the present invention are described with reference to the following drawings, in which.

DETAILED DESCRIPTION

Figure 1:
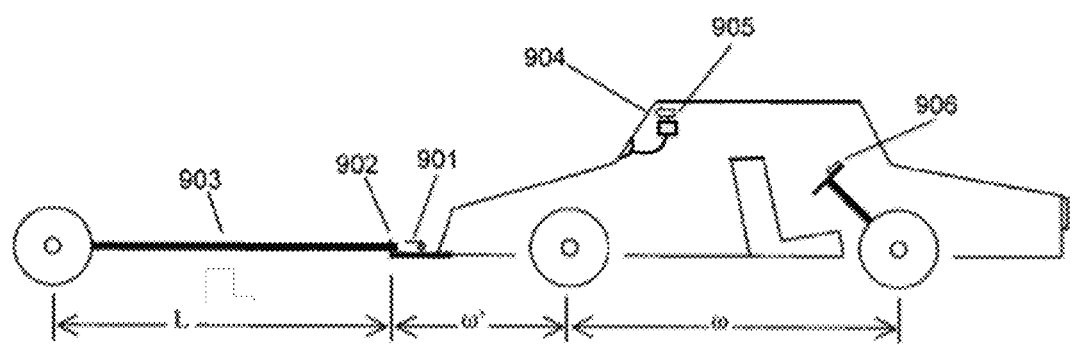
FIG. 1 depicts a system for sensing and presenting data in accordance with various embodiments of the invention.

The present invention relates to systems for guiding a trailer while backing FIG. 1, illustrates components for sensing and presenting data in a system for guiding a trailer while backing. The present invention is contemplated to be, in whole or in part, an after market system that can be added to a towing vehicle 904 and trailer hitch 902, but any of the components of this system could be installed at the time of manufacture of either the tow vehicle 904, or the trailer 903, or both. Likewise, any of the components of this system could be permanently installed in either the tow vehicle, or the trailer, or both after the time of manufacture. While it is an aspect that these sensing devices, displaying and operator informing devices and data communicating devices can easily be installed or removed, it is not a requirement that all of these devices be easily installed or removed. This figure is very similar to FIG. 9 of the '953 patent. In particular, a sensor 901 is present to measure the hitch angle, a sensor 906 is present to measure data from which the system can derive the turning radius, and an indicator 905 is present to indicate to a user of the system a direction in which the trailer will travel given the hitch angle and turning radius.

Steering Sensor

The steering sensor is a motion sensor that is attachable and removable to the steering wheel or to any component of the steering linkages or systems whose motion corresponds to or that could be used to identify the position of the front wheels or their turning angle.

Figure 2:
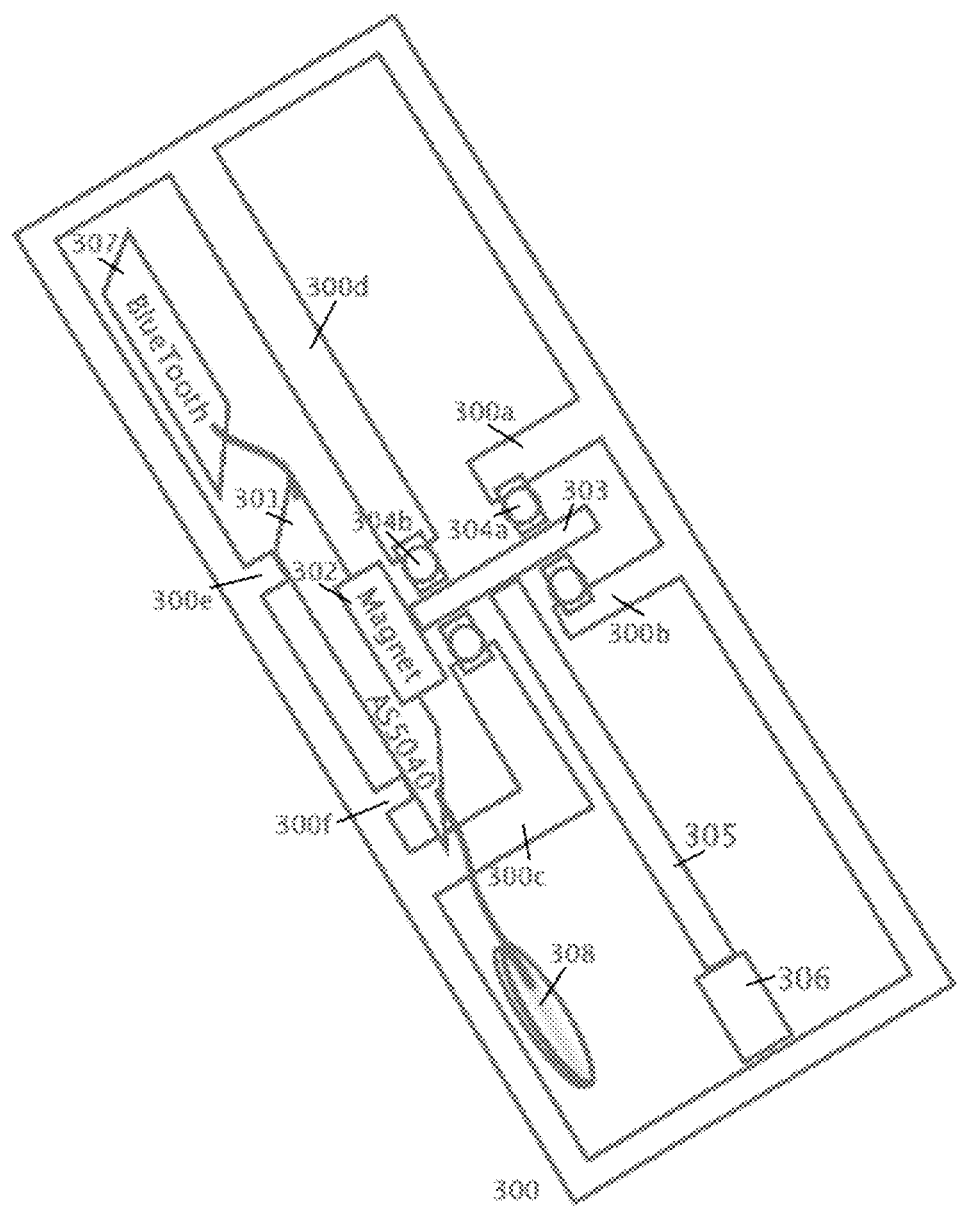
FIG. 2 depicts a cross section of a pendulum type steering wheel sensor in accordance with various embodiments of the invention.

FIG. 2 illustrates a cross-section of a magnetic rotational sensor. This sensor is packaged in a case 300, typically made of a material such as plastic (but, could be metal or another material) in which molded supports 300a & 300b hold upper bearing 304a and molded supports 300c & 300d hold lower bearing 304b. These bearing mounts can come from the case top (as with 300a & 300b), bottom (as with 300c) or the sides (as with 300d) so long as the bearing mounts do not interfere with the motion of the pendulum as described, below. Mounted through bearings 304a and 304b is a shaft 303 which has on its end a diametrically magnetized permanent magnet 302. Attached to the shaft (typically between the bearings for balancing purposes) is a pendulum consisting of an arm 305 with a weight 306 attached to its end. The magnet, shaft, bearings and case assembly positions the magnet such that it rotates just above the surface of a magnetic rotation sensor integrated circuit (such as the AustrianMicrosystems AS5040) mounted on printed circuit board 301 (this board is mounted to the case by molded standoffs 300e & 300f). The pendulum causes the magnet to be rotated as the case 300 is rotated in earth's gravitational field because the pendulum weight will be kept positioned at its lowest point due to gravity. Also mounted to case 300 is a circuit board 307 comprising a microprocessor with Bluetooth and a battery 308 to power the device (a power switch, not shown, would be included in the case). In operation, case 300 is mounted on a bar 403 that extends across a portion of the steering wheel (taking care to not position case 300 where it might interfere with any devices on or within the steering wheel, such as the air bag 401) such that as the steering wheel is rotated, case 300 is likewise rotated and the rotational position is sensed by the magnetic rotational sensor comprised by circuit board 301 (see FIG. 3). The resulting sensed rotation data is the read by the microprocessor with Bluetooth comprised by circuit board 307 wherefrom the data can be transmitted (via the Bluetooth, but other wireless signals could be used as well such as ZigBee, Wi-Fi, or others) to the other components of the trailer reversing system. The steering sensor 400 also provides a push button 405 for user input.

The steering wheel rotational data can be transmitted as sensed or, to take advantage of any available processing power of the microprocessor with Bluetooth comprised by circuit board 307, any amount of algorithmic transformation or other look-ups or calculations can be made. This can be anything from the most simple (such as rounding of the sensed steering wheel rotational angle) to a full determination of the turning radius, or any other data based of the steering wheel rotation (or other information sensed by the steering wheel assembly, such as a button press of push button 405).

The steering linkage between the steering wheel and the front wheel turning mechanisms is different from one vehicle to the next (as a function of such things as a rack and pinion gear ratios, for example). To have the steering sensor compute turning radius, means to translate steering wheel rotational data (measured from a reference position) into vehicle wheel turning angle data is required along with a measure of the wheel base, w, of the vehicle. This translation means can be as simple as a multiplier constant, k, that is equal to the number of degrees that the vehicle's front wheels turn (assuming traditional front wheel steering and a linear relationship between the steering wheel rotation and the turning of the vehicle's wheels) divided by the number of degrees, Ω, that the steering wheel is rotated (as measured from a reference position) to effect that amount of turning of the vehicle's front wheels. As described in the '953 patent, turning radius, R, would then generally be calculated as R=w/Tan(kΩ). To calibrate the device (e.g., to compensate for users attaching the device to their steering wheel in other than the top center position), a push button 405 on the steer sensor 400 is provided that would be pressed when the vehicle is being steered in a straight line (i.e., the turning angle of the front wheels is zero) to command the device to sample the steering wheel angle and save that value as the sampled zero reference position value, z; then for any sampled steering wheel angle, s, the equation would be expressed as:

$$R=w/\text{Tan}(k(s-z))$$

For example, if turning the steering wheel 30 degrees (i.e., the difference between the example's steering sensor reading and the steering sensor reading corresponding to steering the vehicle in a straight line is 30 degrees) results in the front wheels turning 10 degrees, the multiplier constant would be 0.3333; the turning radius equation would be: R=w/Tan (0.3333(s−z)). If the relationship between the steering wheel rotation and the turning of the vehicle's wheels is not linear, this translation means can be implemented with a non-linear calculation or as a look-up table (given a steering wheel angle, look up the turning radius); this look up approach could also be used to improve the effective performance of a slow microprocessor. A user of the system would need to input a few parameters for the vehicle such as this steering-wheel-to-front-wheels-multiplier, k, and the vehicle's wheel base, w, or to simplify set-up for the user, a single vehicle code could be entered to enable the device to look up w and k in an internal table for that type of vehicle instead of having to enter two separate numbers for that type of vehicle (one number for the multiplier constant, k, and a second number for the wheel base, w).

Alternatively, one of the other components of the system could perform the look up of the vehicle code and then transmit the multiplier constant, k, and the wheel base, w, to the steering wheel device. This could be the case if, for example, the trailer direction presenting device (or any other system component or an additional component) is a smart phone (or a tablet device such as Apple's iPad™, a lap-top computer, or another device), typically running an operating system such as iOS™, Android™, or some other operating system) with access to the internet or to a database, in which case an app could be downloaded to that device to provide access to a vehicle database complete with images of the vehicle that the user would use to select the vehicle and said selection would then look up the multiplier constant, k, and the wheel base, w, in an online database system (a system that could be easily and centrally updated with this information for new vehicles) and download those values to the trailer backing system via that smart phone (of course, a website could provide the same lookup capability such that the user of the present invention could acquire the multiplier constant, k, and the wheel base, w, for manual entry into the system of the present invention). The actual calculation of the turning radius could be performed by any of the components of the trailer backing system.

Figure 3:
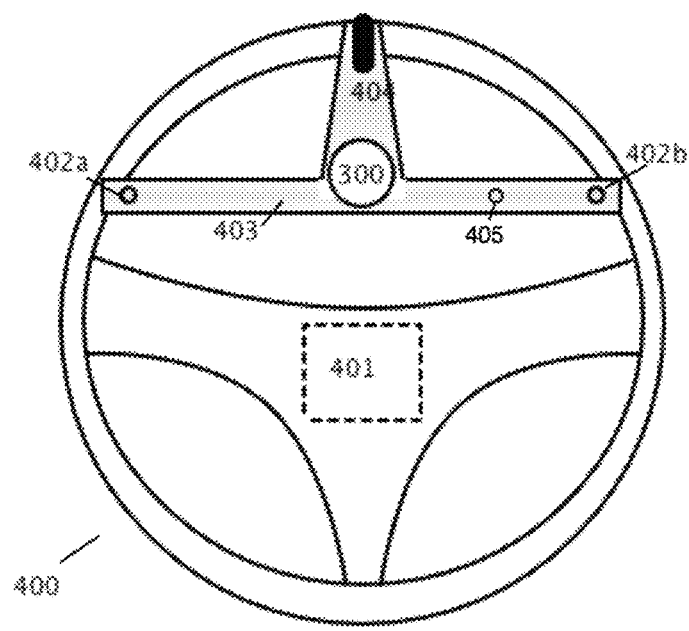
FIG. 3 depicts the steering wheel sensor from FIG. 2 mounted on a steering wheel in accordance with various embodiments of the invention.

FIG. 3 illustrates a steering sensor as described above and as shown in FIG. 2 mounted on steering wheel 400. In the center of steering wheel 400 is an airbag 401. Steering sensor mounting bracket 403 has two pins 402 protruding from its back surface (left pin 402a and right pin 402b); these pins slant away from the center of bracket 403 as they extend back from bracket 403. To install this bracket, pins 402a and 402b are positioned in interior opening in steering wheel where the bracket will not interfere with airbag 401, and then the bracket is slid towards the top of the wheel (as it is depicted in the figure) such that the outwardly slanting pins grip the interior of the steering wheel and the top extension of the bracket rests on the front surface of the wheel near the top of the wheel. To keep the bracket from slipping down and out of this position, a strap 404 is wrapped from the back of the top extension of the bracket around the wheel and over the front of the top extension of the bracket where it is held by a fastener, by Velcro, or by any fastening means known to those skilled in the art. The back surface of the bracket 403 is flat (i.e., is of a single plane) and so the plane of the bracket will be aligned with the front plane of the steering wheel. Since nearly all steering wheels' plane of rotation is parallel to the plane of this front surface of the steering wheel, in this position, with the strap fastener 404 secured, the plane of rotation of the pendulum within case 300 of steering wheel rotation sensor will be aligned with the plane of the steering wheel's rotation. Other features of the device can include buttons or switches (for example, a button to press for indicating that the vehicle is steered in a straight line for calibrating the steering angle or for indicating that the vehicle and trailer are in a straight line for calibrating the hitch angle sensor), displays (for example, an LED that will blink when approaching a jackknife condition), or other features (for example, a buzzer that will sound when approaching a severe jackknife condition); these extra features can be used with communications to or from other components in the system (for example, a button pressed to indicate that the vehicle and trailer are in a straight line could be communicated to the hitch angle sensor; or, in an alternate configuration, a button pressed to indicate that the vehicle is steered in a straight line could be used by the steering sensor without communicating that information to any other component in the system).

In operation, the steering wheel sensor can be configured to send steering wheel position derived data (i) at regular intervals, (ii) only when the value to be sent changes or changes by more than a threshold amount above or below the last value sent, (iii) only when requested or commanded by another component of the system, or (iv) any combination of the above (for example, only when the value changes or after a time interval if not changed).

Figure 4A:
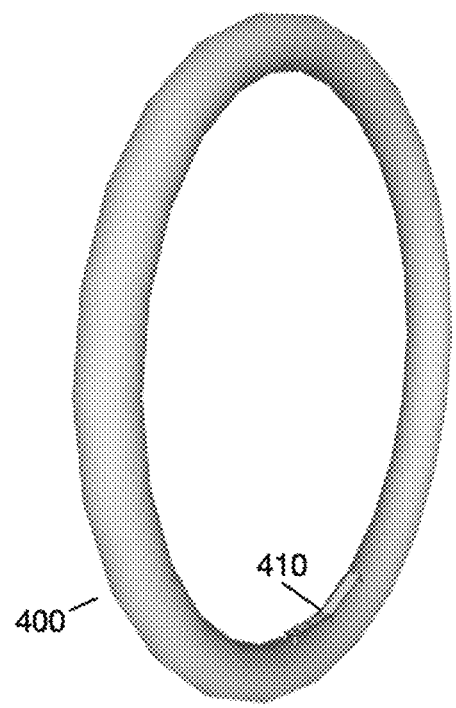
FIG. 4A depicts a steering wheel sensor based on an inertial measurement unit (IMU) showing placement on a steering wheel.
Figure 4B:
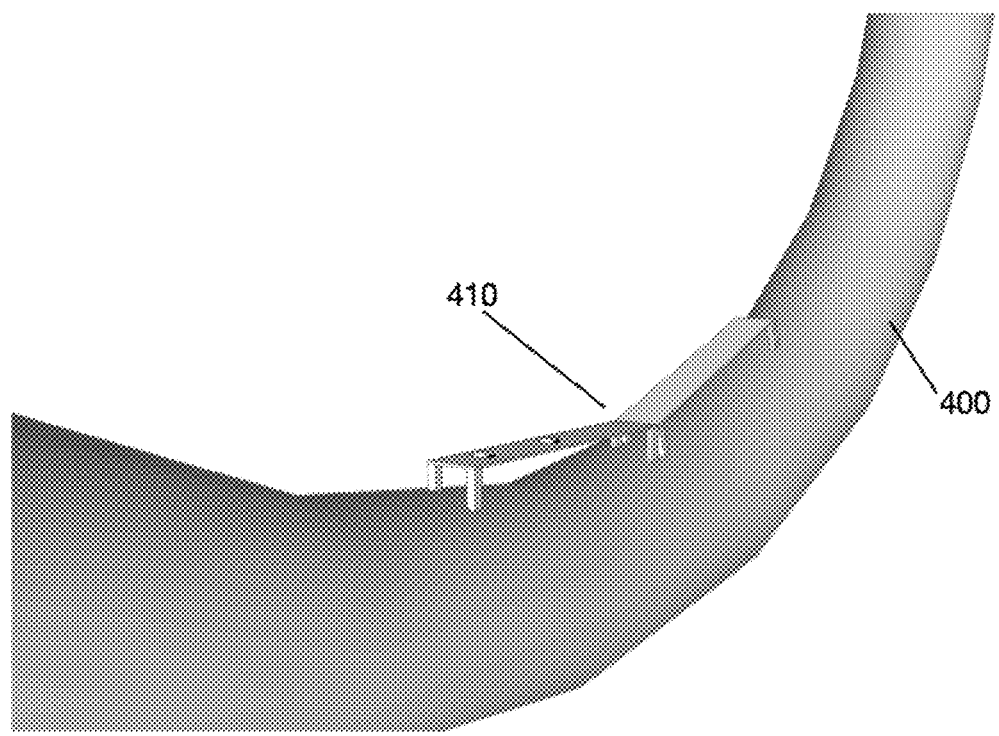
FIG. 4B depicts a close-up of the steering wheel sensor based on an IMU showing placement on a steering wheel.
Figure 5A:
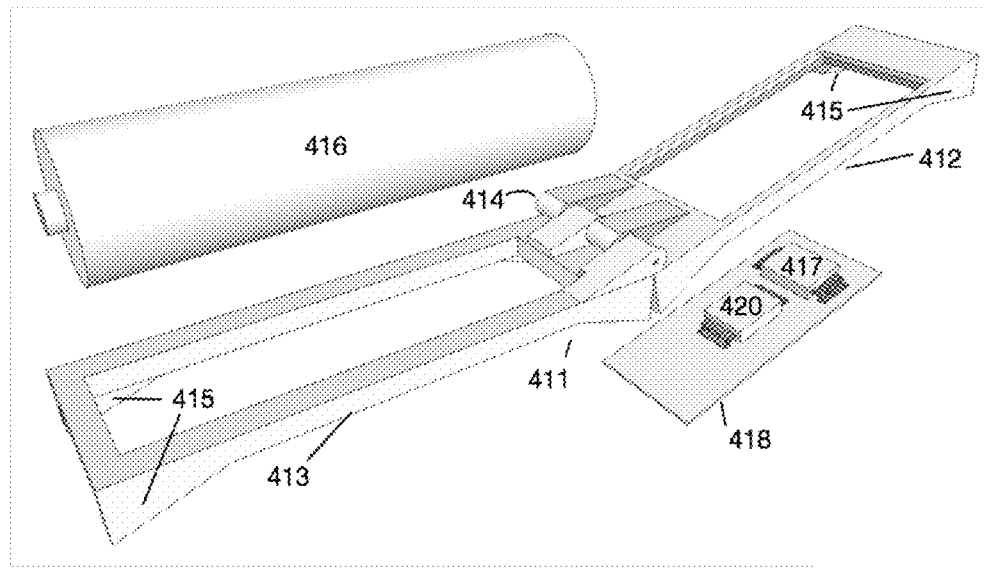
FIG. 5A depicts an exploded view of a hinged steering wheel sensor showing boards representing electronics for the microcomputer, wireless communications and IMU on the right and a AA or AAA battery on the left.
Figure 5B:
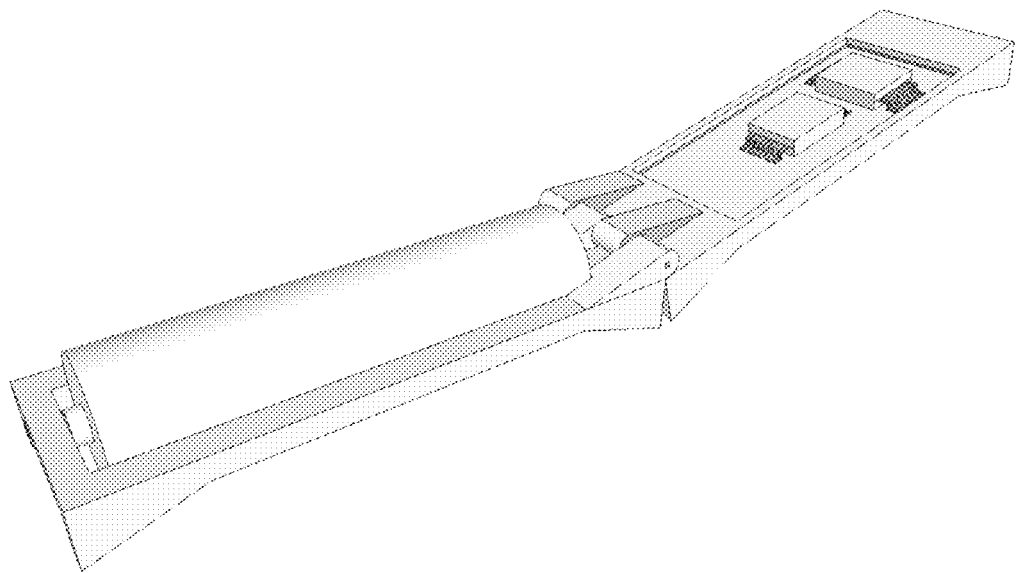
FIG. 5B depicts an assembled view of a hinged steering wheel sensor showing boards representing electronics for the microcomputer, wireless communications and IMU on the right and a AA or AAA battery on the left.

FIG. 4A depicts an alternate steering wheel sensor 410 based on an Inertial Measure Unit (IMU) mounted on a steering wheel 400 (with a closer view in FIG. 4B). Not shown is the holding mechanism that keeps the sensor in place against the inside arc of the steering wheel; this holding mechanism can be a Velcro strap that wraps around the wheel and sensor together, or could be a flexible plastic wrap or could be a steering wheel cover with extra room to accommodate the sensor, or the like (other holding mechanisms will be apparent to those skilled in the art) such that the steering sensor can be installed or removed from a vehicle's steering wheel by hand without requiring the use of tools. To provide for aligning the axes of the IMU with the plane of the steering wheel and the axis of rotation of the steering wheel, a hinged platform 411 is provided and depicted in FIG. 5B (shown in exploded view in FIG. 5A). The platform is divided into two half-platforms 412 & 413 where one half-platform 412 holds the circuit board 418 to which electronic components such as the IMU 420 and Bluetooth enabled microcomputer 417 (such as the nRF51822 by Nordic Semiconductor) are mounted, and the other half-platform 413 holds the power source, such as a AA or AAA size battery 416. It is preferred, but not required, that the battery is rechargeable. The axis of the hinge 414 runs perpendicular to the length of the two half-platforms 412 & 413 of the platform. Each platform has legs 415 that will straddle the centerline of the inside radius of the steering wheel (the outside radius of the steering wheel could be accommodated as well but might interfere with driving). A half-platform, if by itself, would have to be placed against the steering wheel and be positioned such that the half-platform is perpendicular to the plane of steering wheel 400. The combination of legs and the hinge causes the full platform to be generally self-aligning to be perpendicular to the plane of the steering wheel. This alignment will place the IMU 420, which is generally located in the center of half-platform 412 on a radius of the steering wheel's center of rotation (i.e., the Z-axis of the IMU is pointing at the center of rotation of the steering wheel and one of the X-axis and Y-axis will be pointing perpendicular to the plane of the steering wheel with the other pointing parallel to a tangent to the wheel). The inner set of legs (those adjacent to the hinge) will stop the hinged platform 411 from being folded open past a straight position and thereby prevent wires from the battery 416 to the circuit board 418 from being pulled. A push button (not shown) can be mounted separately on can be added to the circuit board as space allows.

As those skilled in the art are aware, an IMU contains MEMS gyroscopes and accelerometers and can be used to measure the rotational position of the steering wheel and return a value in degrees (or radians or percentage of one full rotation) as was done with the magnetic rotation sensor with the pendulum and mounted magnet. Examples of suitable IMU's include, among others, the LSM330DLC or the LSM6DS3 by STMicroelectronics. Those skilled in the art will be familiar with numerous articles (such as the web based article "Accelerometer & Gyro Tutorial" found at http://www.instructables.com/id/Accelerometer-Gyro-Tutorial/?ALLSTEPS), books, and application notes for deriving the rotational position of the wheel using an IMU based steering sensor such as the one described herein.

Hitch Angle Sensor

The hitch angle sensor must be designed not to be damaged either during hitching up a trailer (due to a collision between the hitch and sensor with a part of the trailer) nor while towing on the highway (due to kicked up debris). This is accomplished by incorporating means to position the hitch sensor such that it is not exposed below the hitch ball where it would be most vulnerable to being struck by kicked up debris while traveling on the highway. This is further accomplished by enabling the sensor to be positioned away from the hitch ball both when hitching up a trailer and during operation to collect hitch angle data, thereby avoiding damage by having the trailer tongue or any of its components collide with the sensor. This is alternatively accomplished by mounting the sensor in a hardened case as described below with FIGS. 14A, 14B and 15.

Figure 6:
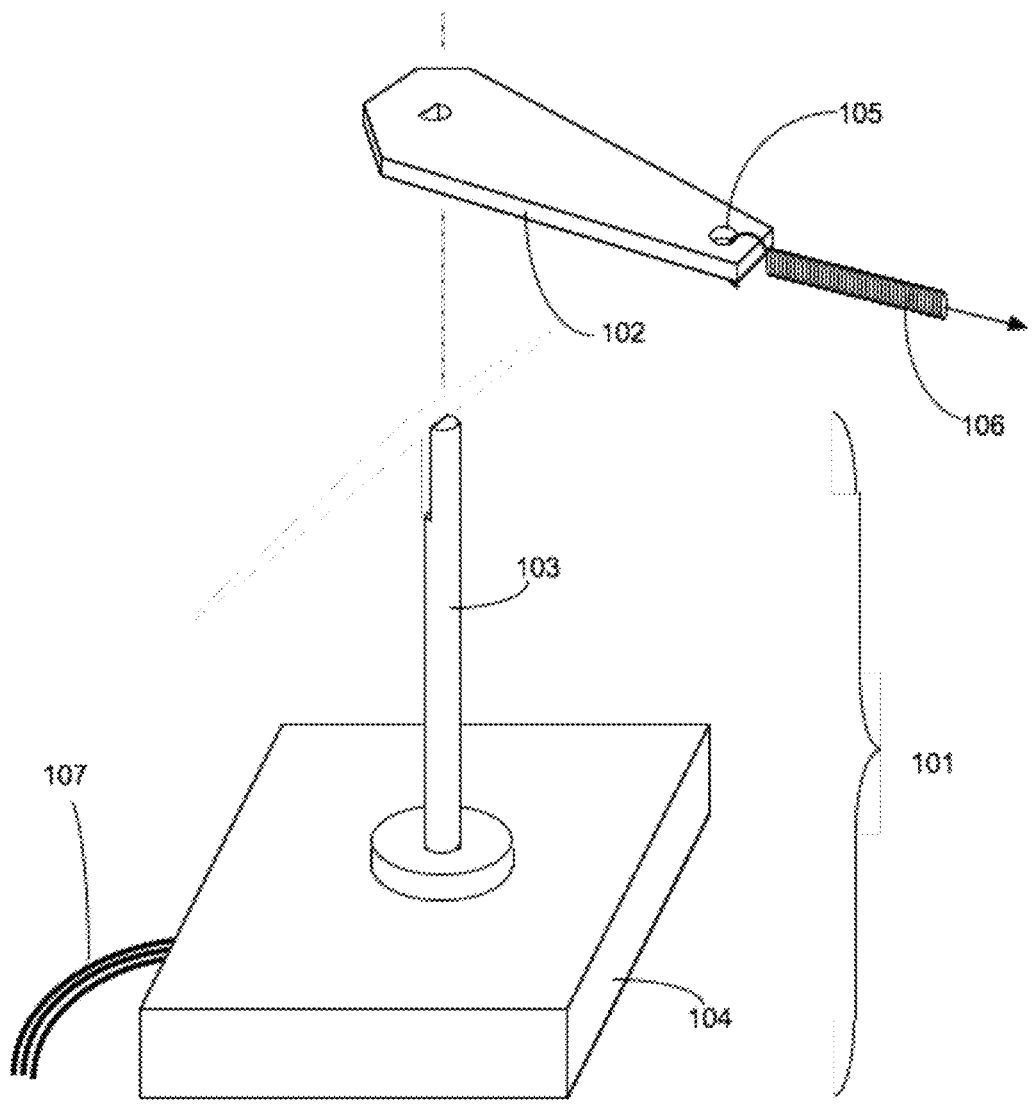
FIG. 6 depicts a hitch angle sensor in accordance with various embodiments of the invention.

A hitch angle sensor is a small device having a body and a shaft. Referring to FIG. 6, a basic hitch angle sensor is depicted. A detailed description of the circuits and operation of a hitch angle sensor are found in the '953 patent. Generally, the hitch angle sensor 101 would have an arm 102, one end of which would be connected to a shaft 103. This shaft is mounted into electronics box 104 such that it can rotate. This rotation is sensed by the electronics within the electronics box 104 to determine the angle between a reference direction of electronics box 104 and the centerline of arm 102. The other end of arm 102 has a hole 105. This hole 105 is a mounting point for an extendable coupling such as a stretchable (e.g., an elastic or wire spring) connection cord 106 or a telescoping rod. This stretchable connection cord would be connected from the arm 102 of the hitch angle sensor to a hook-up point (such as a small metal loop, a drilled hole, or any other feature proximate to the trailer tongue's centerline to which a stretchable connection cord 106 could be connected) on the tongue of the trailer being towed. This cord connects to this pull point on the trailer such that the hitch angle sensor arm is kept pointing in the direction of this pull point. This elastic connection cord 106 would typically have a small hook at each end such that one end will connect to the hitch angle sensor arm hole 105 and the other end will connect to the hook-up point on the trailer tongue. This stretchable connection cord could be a mini bungee cord, a long light-weight spring, an inelastic cord with an elastic portion or spring mount, or the like. Some amount of elastic property is desired in this connection cord to accommodate motion of the hitch in the up and down direction such as would occur when the trailer is towed over a rise or through a dip or due to any other bump or motion that would cause motion in other than the axis of rotation being measured by the sensor. The step of connecting this elastic connection cord 106 would be added to any checklist of steps to be taken when hitching up a trailer; the step of disconnecting this elastic connection cord 106 would be added to any checklist of steps to be taken when unhitching a trailer. This checklist of steps could be done on paper or through an electronic checklist.

The hitch angle sensor 101 would have a cable 107 to provide power and, optionally on versions not using wireless, communications signals. Power for the hitch angle sensor is provided from the vehicle through connections to the wiring harness that is already present on most hitch assemblies to provide power to the trailer for such purposes as tail lights, break lights, automatic breaking systems, and the like. Alternatively, power could be provided by incorporating batteries into the sensor assembly, but this would require the extra operator intervention of switching the circuits on or off. The sensor output is provided to monitoring systems in the vehicle by way of an additional wire incorporated into that same wiring harness or by such commercially available wireless connections as Wi-Fi, ZigBee or Bluetooth, or the like. Alternatively, a separate cable to provide power and communications (such as a hardwired serial RS-232 link or other wired communications capability) between the sensor and a system in the vehicle could be used. Alternatively, a separate cable to provide just communications between the sensor and a system in the vehicle could be used if power could separately be obtained through the wiring harness. Alternatively, the hitch angle sensing data signal could be incorporated into the wiring harness.

Figure 7:
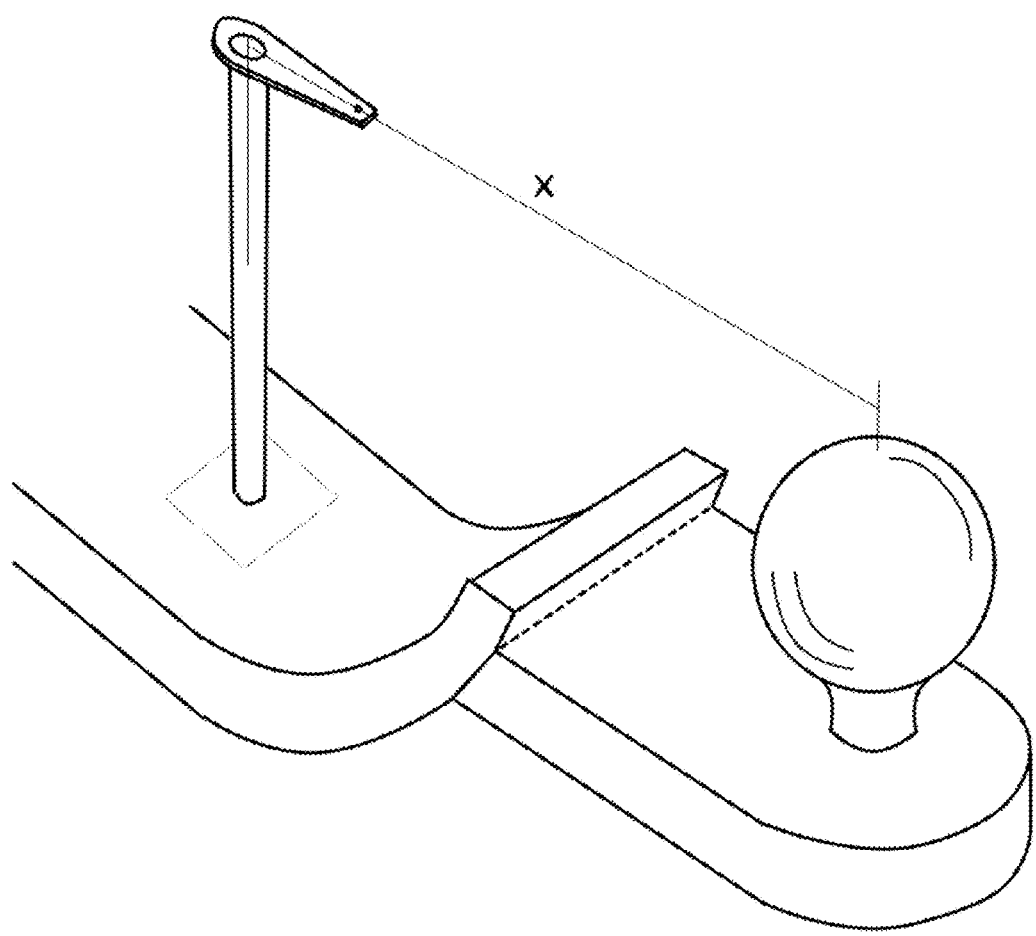
FIG. 7 depicts a generalized image of hitch angle sensor built into a basic trailer hitch ball mount.

During operation—that is to say, during the time when the hitch angle is being sensed—the sensor can be positioned in-line with the axis of the hitch support (and when the hitch angle is zero, also in-line with the center line of the trailer). FIG. 7 shows a possible placement of a hitch angle sensor relative to the hitch ball showing the in-line placement of the center of rotation of the connection arm and its supporting shaft with the center of rotation over the hitch ball.

Figure 8:
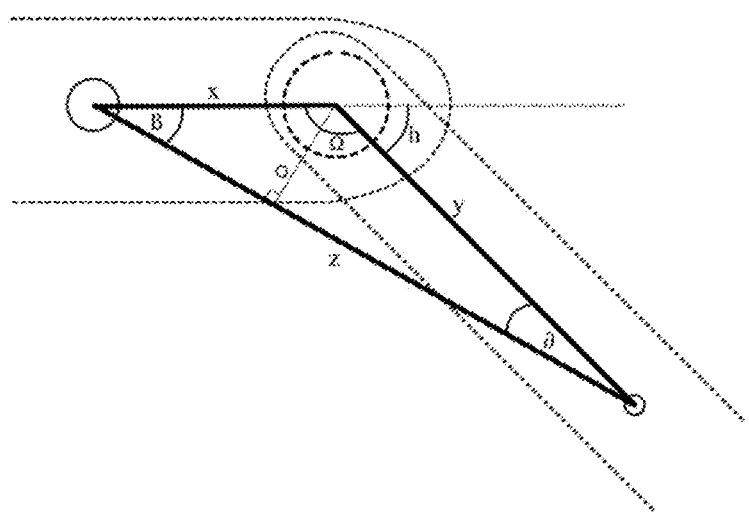
FIG. 8 depicts the hitch angle sensor geometry according to a preferred embodiment of the present invention.

If the axis of rotation of the sensor is located on the center line of the vehicle and is at a distance x from the axis of rotation of the trailer tongue upon the hitch ball, and the mounting point is located on the center line of the trailer and is at a distance y from the center line of the rotation of the trailer tongue upon the hitch ball, a triangle will be formed having as its sides the line representing the distance x, the line representing the distance y, and a line, z, representing the stretchable connection cord. This triangle is represented in FIG. 8 and a line, Q, perpendicular to z, has been drawn. In this triangle, a first angle, $\beta$, is formed between the line representing the distance x and the line, z, a second angle, $\partial$, is formed between the line representing the distance y and the line, z, and a third angle, $\Omega$, is formed between the line representing the distance x and the line representing the distance y. It is therefore the case that $\sin \beta = Q/x$, $\sin \partial = Q/y$, and $\Omega = 180° - \beta - \partial$. The hitch angle, $h = 180° - \Omega$. Solving for $\beta$ and $\partial$ gives $\beta = \sin^{-1}(Q/x)$ and $\partial = \sin^{-1}(Q/y)$ and substituting into the equation for $\Omega$ gives:

$$\Omega = 180° - \sin^{-1}(Q/x) - \sin^{-1}(Q/y)$$

This equation can then be used to calculate the hitch angle (as will be apparent to those skilled in the art) if x and y are known and B is measured. However, if the mounting point is set to be at a distance from the center line of the rotation of the trailer tongue upon the hitch ball that is equal to the distance between the center line of the axis of rotation of the sensor and the center line of the rotation of the trailer tongue upon the hitch ball (i.e., x=y), then the equation simplifies as follows:

$$\Omega = 180° - \sin^{-1}(Q/x) - \sin^{-1}(Q/x)$$

$$\Omega = 180° - 2 \sin^{-1}(Q/x)$$

Substituting $\sin \beta$ for (Q/x) gives:

$$\Omega = 180° - 2 \sin^{-1}(\sin \beta)$$

or: $\Omega = 180° - 2\beta$ or: $2\beta = 180° - \Omega$

Since, from above, h, the hitch angle, is equal to $180° - \Omega$, we can see that when x=y, the hitch angle equals $2\beta$ or two times the measured angle, B:

$$h = 2\beta$$

This relationship is confirmed by the observation that when x=y the triangle becomes an isosceles triangle and the two angles, $\beta$ and $\partial$, formed between side z and either side x or side y, respectively, are equal, resulting in the third angle, $\Omega$, being equal to $180° - 2\beta$.

Figure 9:
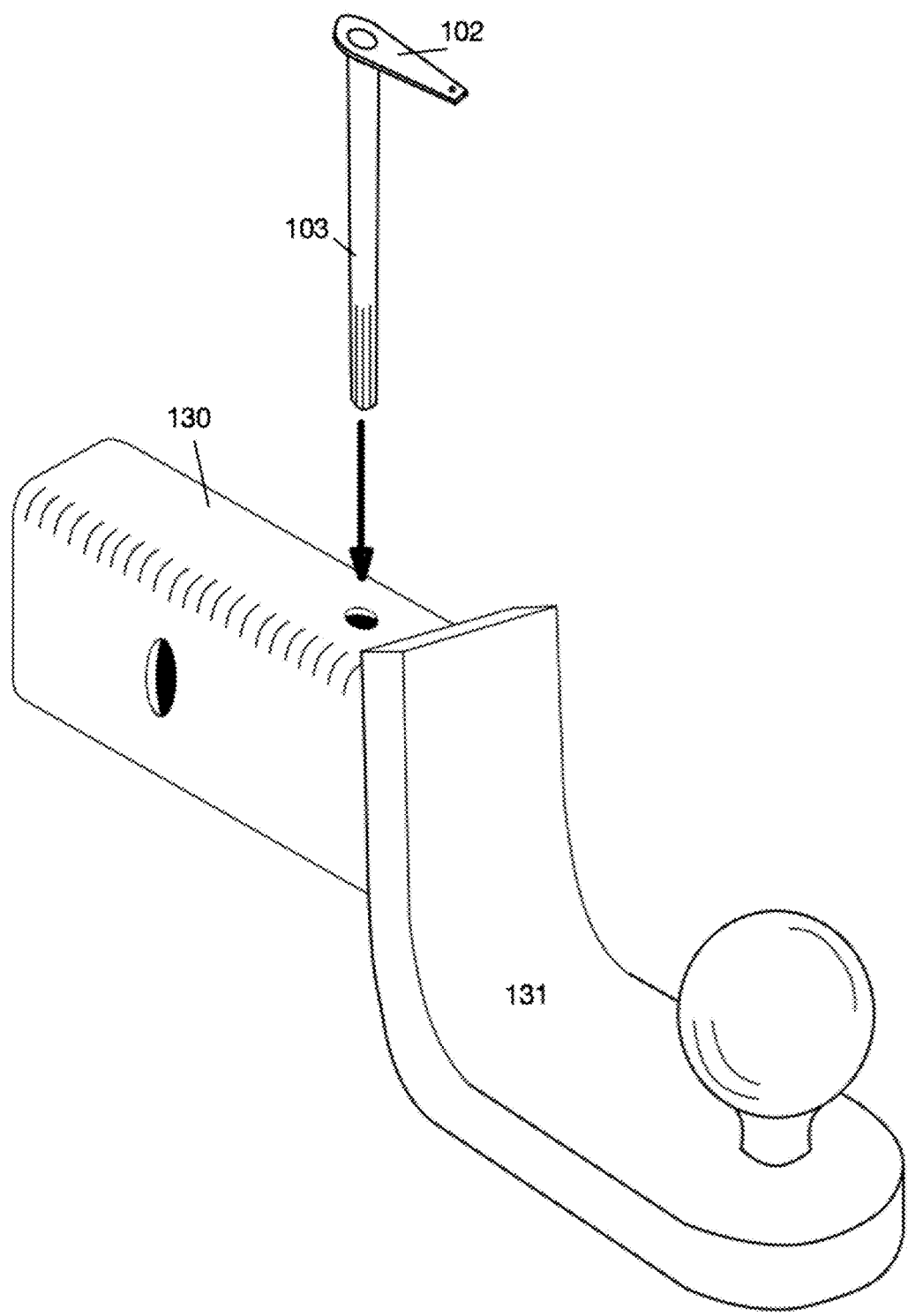
FIG. 9 depicts a generalized image of a hitch angle sensor built inside of the draw bar of a basic trailer hitch ball mount.
Figure 10:
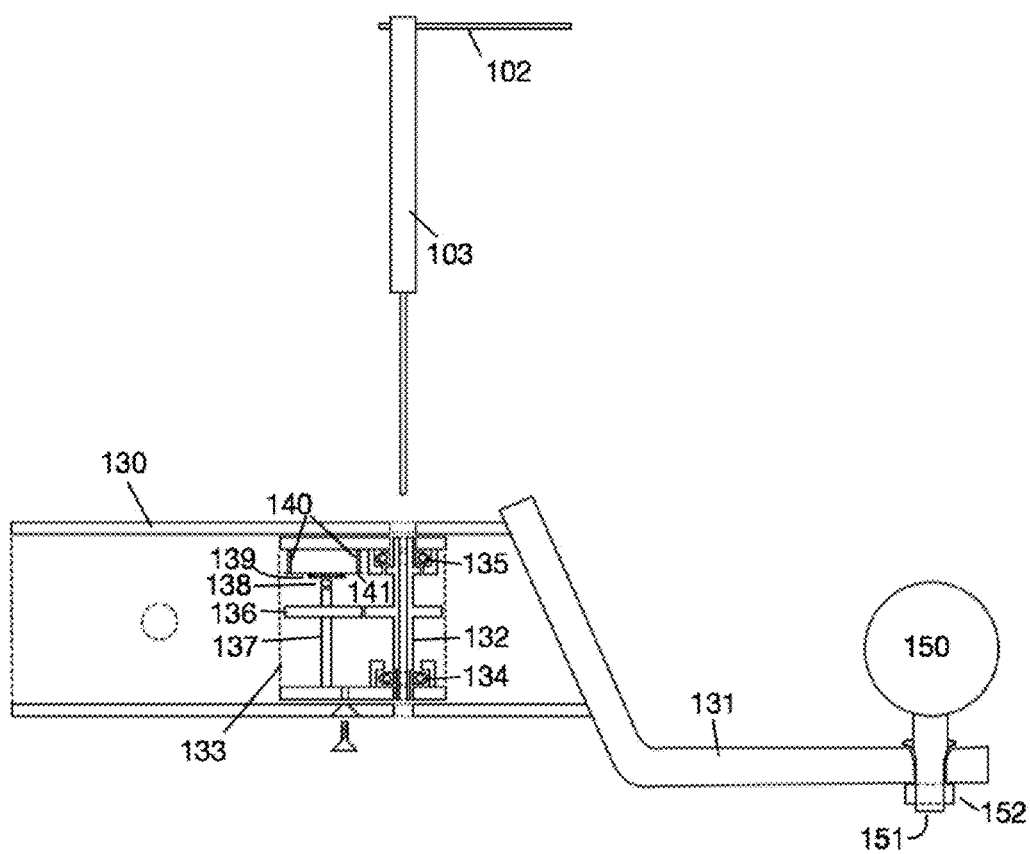
FIG. 10 depicts a cross section of the hitch angle sensor built inside of the draw bar of a basic trailer hitch ball mount.

FIG. 9 depicts how arm 102 and shaft 103 can be made to be removable while the electronics box (along with any bearings and gearing) can be installed within the hitch receiver insert 130 of the hitch ball mount 131. FIG. 10 shows a cross section view of such an electronics box 133 installed within the hitch receiver insert 130 of the hitch ball mount 131. The shaft 103 has a wider top portion to prevent the shaft from dropping through the opening through the hitch receiver insert of the hitch ball mount and into a shaft supporting tube 132. This shaft supporting tube 132 is itself supported by an upper 135 and lower 134 bearing and it has a gear 135 mounted at its center. This gear 135 will meet with a second gear 136 that is mounted on a second shaft 137. The second shaft 137 has a diametrically magnetized permanent magnet 138 mounted at its end closest to the magnetic sensor circuit board. The magnet, shafts, gears, bearings and case assembly positions the magnet such that it rotates just above the surface of a magnetic rotation sensor integrated circuit 139 (such as the AustrianMicrosystems AS5040) mounted on printed circuit board 141 (this board is mounted to the case by molded standoffs 140 and then potted in place to protect it from water that might get into the assembly if the trailer is backed into water as would be the case when launching a boat). The gear ration of the first and second gear can be 1:1 or, to compensate for the '2' in the equation $h=2\beta$, 2:1 in which case the angle read by the magnetic sensor would be the actual hitch angle. Any other gear ratio can be accommodated with the proper mathematical adjustment, as will be clear to those skilled in the art.

Figure 11:
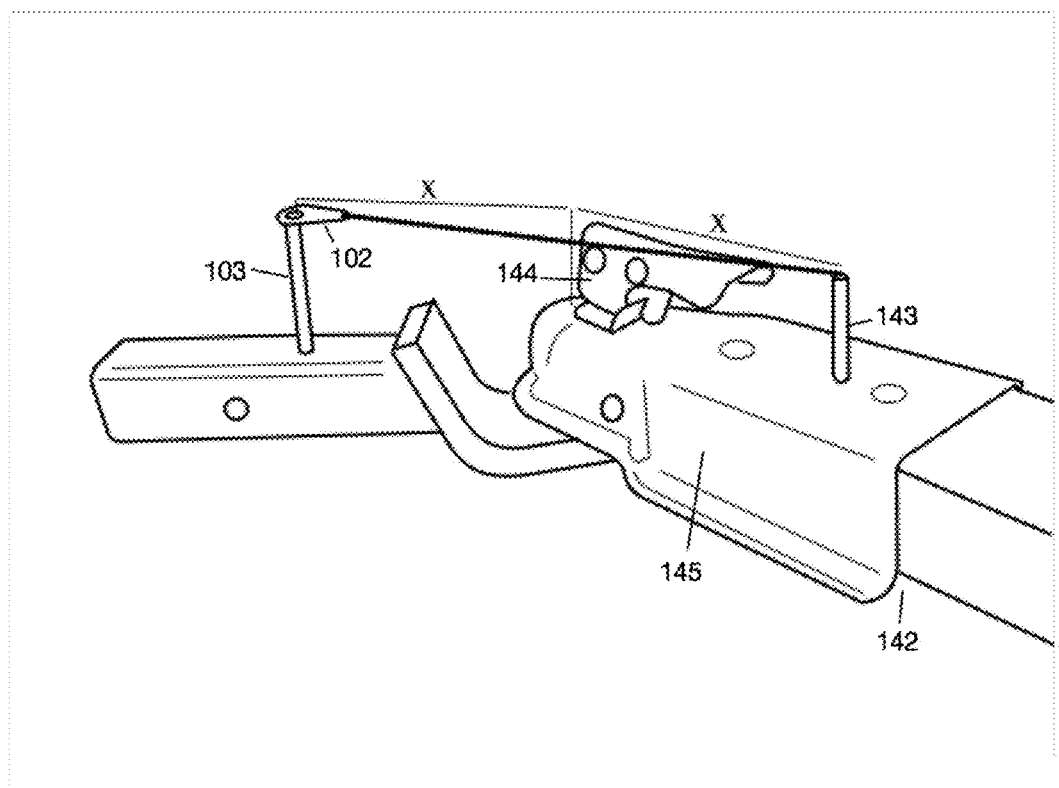
FIG. 11 depicts a generalized image of hitch angle sensor built into a basic trailer hitch ball mount with the trailer tongue and stretchable connection cord.

As is shown in FIG. 11, the shaft 103 would be installed into the shaft supporting tube (where this shaft supporting tube is positioned a distance x away from center line of the rotation of the trailer tongue upon the hitch ball) to measure an angle that when doubled is equal to the angle between the center line of the trailer and the center line of the vehicle towing that trailer, i.e., the hitch angle. This is the critical angle to know during backing of the trailer. It is also preferable, though not required, to mount the sensor connection arm and stretchable connection cord above the hitch, hitch ball, and trailer tongue in order to avoid interference by the safety chains and electrical harness to the trailer hanging below, and this mounting configuration must be high enough to allow clearance over the locking lever 144 of the trailer tongue's coupler 145.

Figure 12:
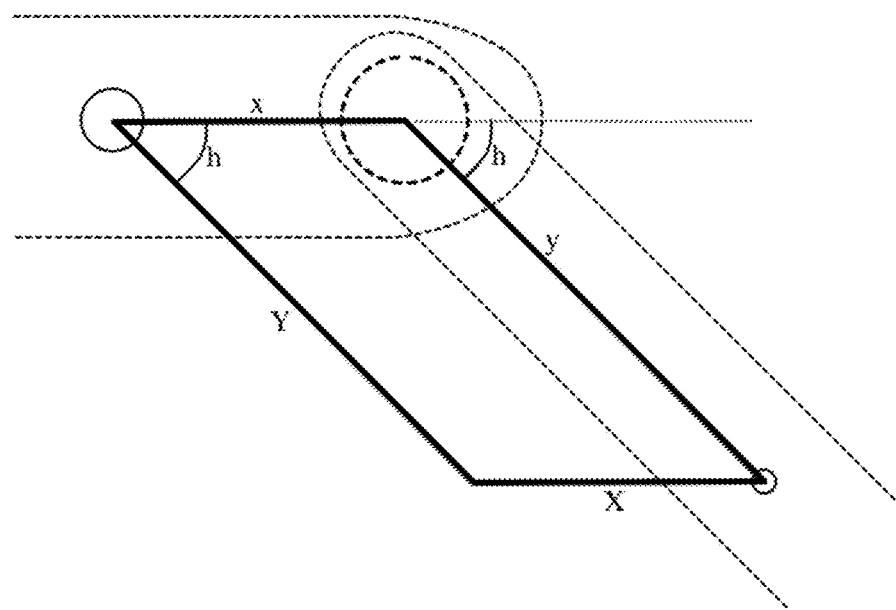
FIG. 12 depicts a variation wherein rigid members X and Y replace the stretchable connection cord and the geometry of a parallelogram is utilized instead of a triangle.
Figure 13:
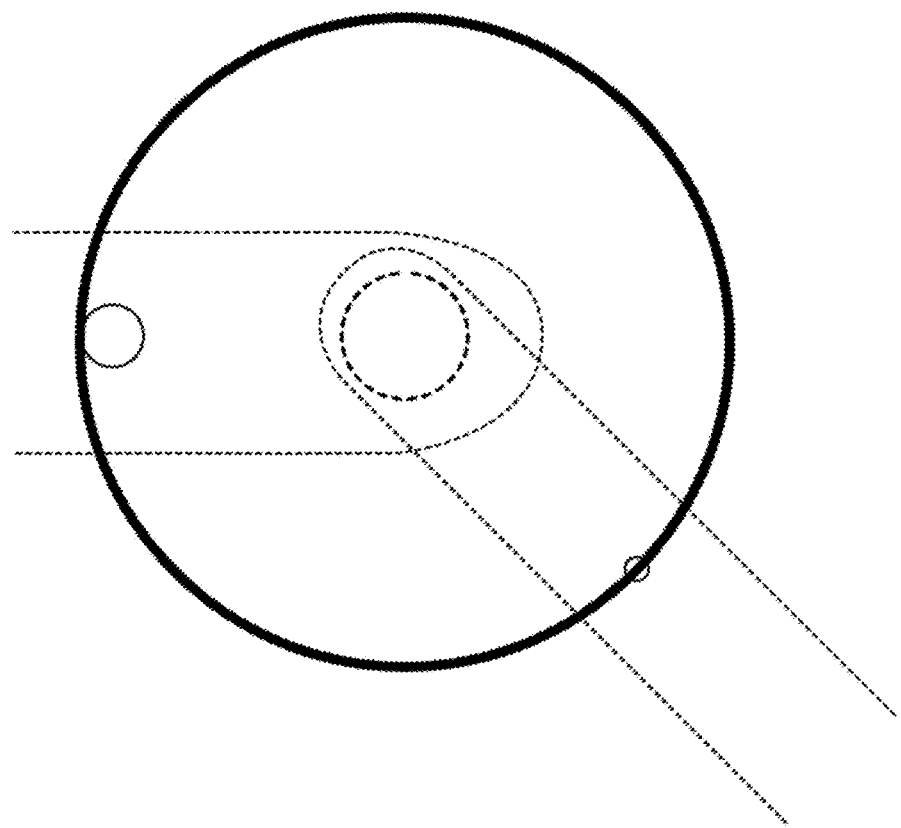
FIG. 13 depicts a variation wherein a planetary gear centered about the hitch ball's center is utilized instead of a triangle.

Alternate connection techniques between the arm 102 and the connection point on the trailer tongue 143 include the formation of a parallelogram (FIG. 12) or a circle (FIG. 13). In the case of the parallelogram, where the shaft 103 is installed into the shaft supporting tube at a distance 'x' from the center of rotation of the tongue on the hitch ball and the connection point on the trailer tongue is at a distance 'y' from the center of rotation of the tongue on the hitch ball, an articulated rod can be used having two segments of lengths 'X' and 'Y' as shown in FIG. 12 to form the parallelogram. The angle h formed by length 'x' and segment 'Y' would equal the hitch angle. In FIG. 13, a planetary gear attached to the trailer tongue and having the hitch ball at its center would engage a smaller gear mounted on shaft 103. The resulting rotation of the shaft 103 resulting from a changing hitch angle would result in a measurable reading from the magnetic rotation sensor to determine the hitch angle. These alternate approaches will be clear to those skilled in the art.

When backing a vehicle while one is hitching up a trailer, one must drive the vehicle towards the trailer such that the trailer tongue of the trailer is positioned just above the hitch ball. The position of the angle sensor places it where it could very easily be damaged during the time when a trailer is being hitched up or when it is being unhitched. This is because when a trailer is being hitched up, the driver of the vehicle must back that vehicle towards that trailer such that the tongue of that trailer is positioned just above the hitch ball (or close enough such that one can then manually align the tongue and hitch ball, if possible). To make matters worse, the hitch ball (as well as the hitch angle sensor) is not clearly visible to the driver of the vehicle. If the arm 102 and shaft 103 shown in FIGS. 9-11 were in the operating position (i.e., the shaft is inserted in the hitch receiver insert), there would be a significant possibility that the trailer tongue would collide with the arm 102 and shaft 103 during this hitching up procedure. However, when equipped with the present invention, by making this arm 102 and shaft 103 removable to the hitch receiver insert of the hitch ball, it can be removed during this hook-up procedure thereby eliminating the danger of damage to the arm 102 and shaft 103. The electronics box 104 (along with any bearings and gearing) is likewise protected from damage by virtue of it being mounted inside the hitch receiver insert of the hitch ball mount. Once the trailer tongue is connected to the hitch ball and secured during hitching up, arm 102 and shaft 103 would be installed into the shaft supporting tube and the elastic connection cord would be connected from the arm 102 to its mounting point on the trailer tongue.

The hitch sensor described above will work well for many situations where the ground is relatively flat and smooth. However, it is often the case that the trailer will have to cross an uneven surface.

Figure 18:
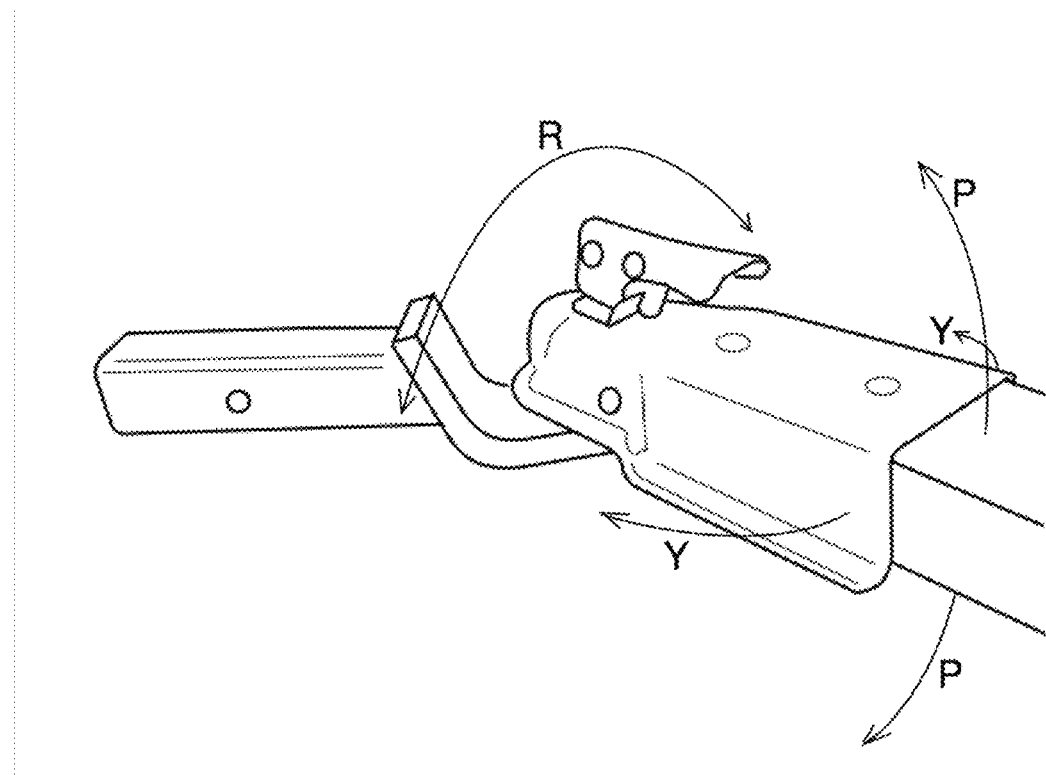
FIG. 18 depicts the motion of a coupled hitch ball and trailer tongue.

For example, if one wheel of the trailer crosses through a pot hole, the trailer may experience a rotation (motion R in FIG. 18) that could cause the connection point on the trailer tongue 143 to deflect with a sideways motion that would cause the stretchable connection cord to likewise move thereby imparting an angular error on the arm 102 and thereby on the hitch angle sensor. An alternate hitch sensor configuration can address these potential measurement errors.

Weight is also a factor in commerce. FIG. 10, also illustrates a typical hitch ball mount with a hitch ball mounted. The hitch ball 150 is typically a solid metal sphere with a stem 151 extending from the bottom of the ball and whereby the bottom portion of the stem is threaded. The hitch ball mount 131 has a corresponding hole through it to enable inserting the threaded stem to pass through the hitch ball mount and be secured from below with a hitch ball nut 152. This entire assembly is typically made of heavy steel to enable it to support a trailer during towing at highway speeds. As a consequence, this hitch ball mount with hitch ball installed is very heavy and costly to ship.

Figure 14A:
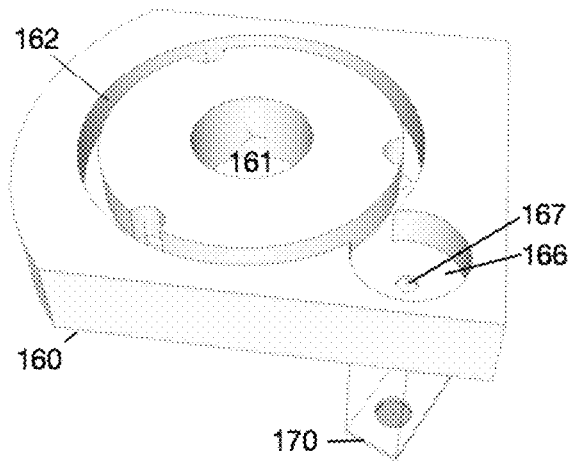
FIG. 14A depicts a top view rendering of a hitch angle sensor adaptor plate in accordance with various embodiments of the invention.
Figure 14B:
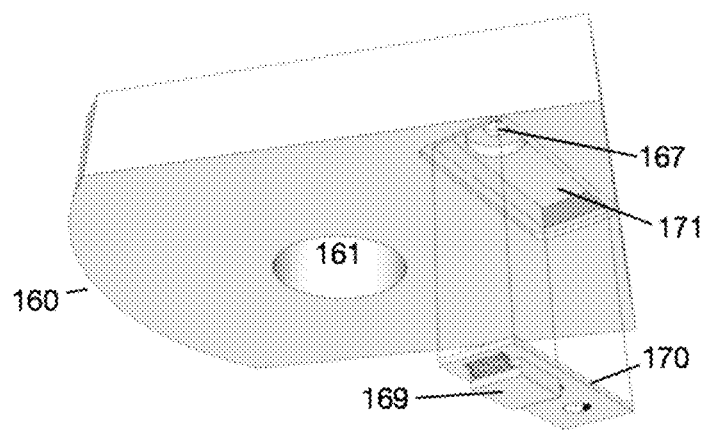
FIG. 14B depicts a bottom view rendering of a hitch angle sensor adaptor plate in accordance with various embodiments of the invention.

FIGS. 14A and 14B show a possible configuration of an adaptor plate 160 according to a variation of the present invention. This plate has a hole 161 that matches the hole in the hitch ball mount such that the adaptor plate can be inserted between the hitch ball and hitch ball mount when the hitch ball is secured to the mount. This will secure the adaptor plate between the ball and the mount. The plate must not be significantly thicker than the amount of threaded stem 151 that is exposed below the hitch ball nut 152 when the hitch ball 150 is mounted without the adaptor plate. This will enable an existing hitch ball and hitch ball mount to be separated and then reattached with the adaptor plate in between. This approach will serve to keep costs low by keeping shipping costs low. By selling only the adaptor plate to be added to an existing hitch ball and hitch ball mount, the weight of the product being shipped is greatly reduced (the hitch ball and the hitch ball mount are both made from heavy steel or other metal and would be costly to ship).

Figure 15:
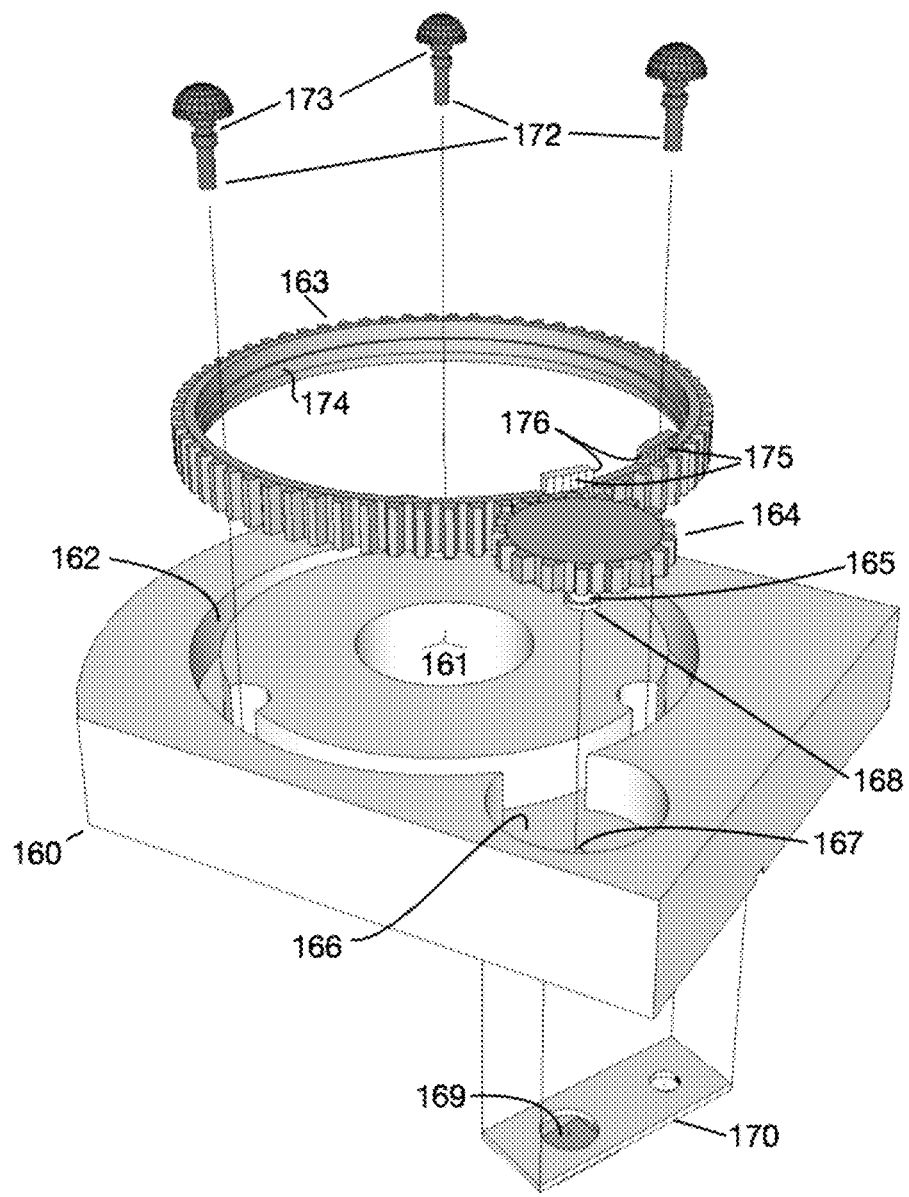
FIG. 15 depicts an exploded view of the hitch angle sensor adaptor plate assembly in accordance with various embodiments of the invention.

As shown in FIG. 15, the adaptor plate has a circular groove 162 in which a toothed ring 163 is mounted on supporting spacers 172. These supporting spacers have a shoulder groove 173 that supports a corresponding inner shoulder 174 in toothed ring 163. This toothed ring 163 will match the teeth of a gear 164 mounted on a shaft 165 supported in a circular recess 166 in the top corner. This shaft goes through a hole 167 to turn a diametrically magnetized permanent magnet 168 that is sensed by a rotation sensor integrated circuit 169 such as the Austrian Microsystems AS5040. As shown in FIG. 14B, electronic circuitry can be mounted on a board 170 that is mounted in a recess in the bottom or at the back of the adaptor plate. This circuitry may also include wired or wireless connection to the backup guidance system (a wired connection could be made through the trailer wiring harness and a wireless connection could be implemented using a Bluetooth communications link, a WiFi communications link, a ZigBee communications link or any other wireless connection); power could be provided through the wiring harness or through the use of a battery. An antenna could be provided through an opening in the adaptor plate for better signal transmission.

Figure 16:
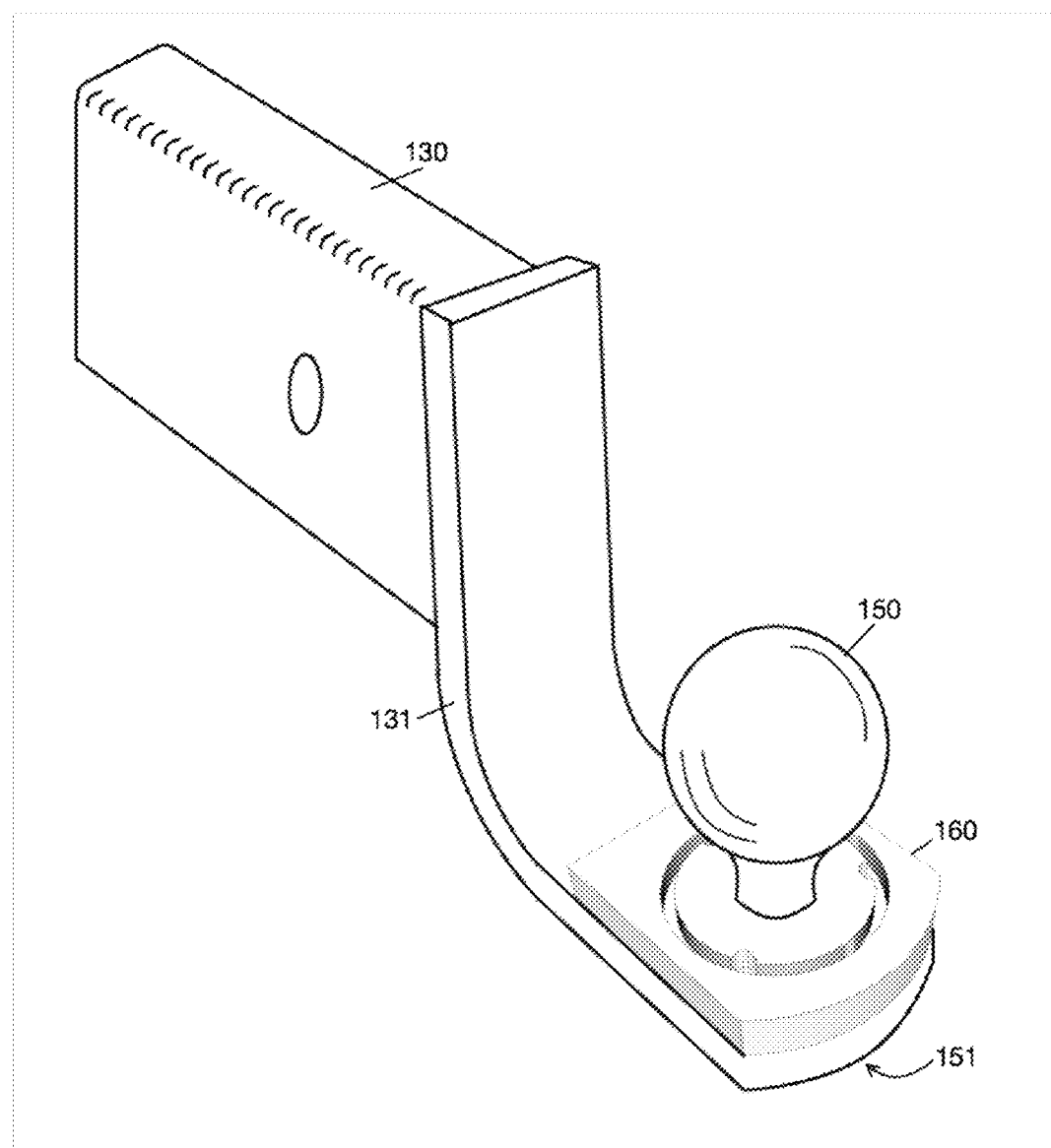
FIG. 16 depicts a hitch angle sensor adaptor plate mounted between a hitch ball and a hitch ball mount in accordance with various embodiments of the invention.

FIG. 16 depicts the adaptor plate 160 after it is fastened between the hitch ball 150 and the hitch ball mount 131. Optionally to prevent the adaptor plate from twisting and becoming misaligned while tightening the hitch ball nut, a textured surface or an extrusion that extends around the edge of the hitch ball mount can be incorporated into the bottom surface of the adaptor plate. The adaptor plate is made of a hard material such as steel so that it can withstand the compression from the hitch ball 150 after tightening the hitch ball nut 151 and also so that it can survive any accidental collision with a trailer tongue during vehicle to trailer coupling. To further reduce weight, the adaptor plate could be made of a hard aluminum alloy with a harder (e.g., stainless steel) insert in the center—in this way, the compression from tightening the hitch ball is supported while reducing the overall weight and materials and labor cost of the adaptor plate (stainless steel is more expensive than aluminum and more costly to machine due to its hardness). A metal casting approach could also be used to produce the adaptor plate. Likewise, the recess for the toothed ring and matching gear is to protect them from corresponding damage. To prevent corrosion from forming over time and interfering with the smooth rotation of the toothed ring and its matching gear and supporting spacers, stainless steel or durable plastic is recommended. Many sensing circuits and mechanical configurations will be apparent to those skilled in the art in light of the present teaching.

Figure 17:
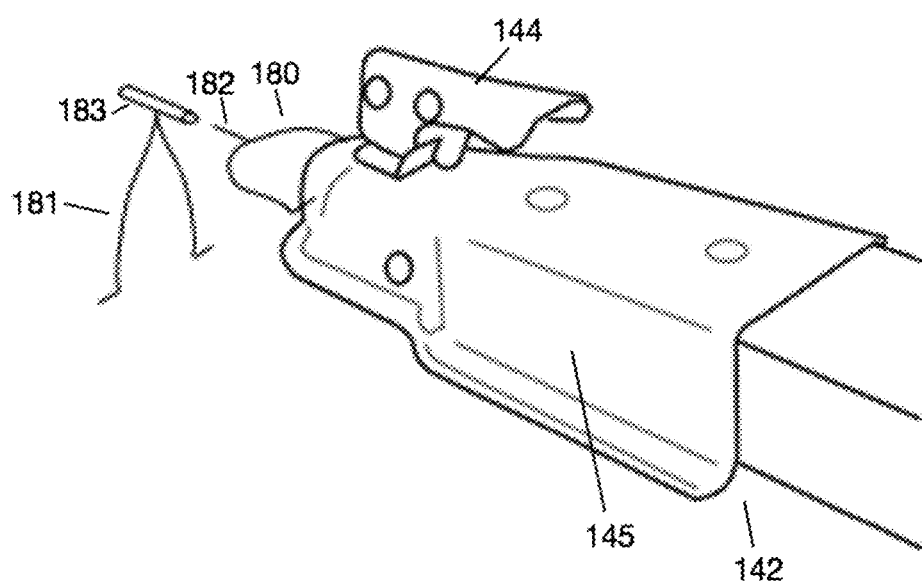
FIG. 17 depicts a stethoscope and wishbone interconnect pin in accordance with various embodiments of the invention.

FIG. 17 depicts a stethoscope 180 and wishbone 181 pin for connecting the trailer tongue's coupler 145 to the toothed ring 163. In this way, as the hitch angle changes, the stethoscope 180 and wishbone 181 pin will cause the toothed ring 163 to rotate in the circular groove 162 thereby causing the mechanical coupling to turn the magnet which is sensed by the electronics. The stethoscope 180 and wishbone 181 pin is designed to be very inexpensive to make its replacement if lost non-costly.

The stethoscope portion connects to the trailer tongue's coupler 145 on opposite sides of the hitch ball equator either by drilling a small matching mating hole on each side of the tongue's coupler or by attaching a supporting plate to either side of the tongue's coupler with each plate having a similarly located matching mating hole (these supporting plates can be mounted by removing the bolts that fasten the coupler to the tongue and reinserting those bolts with the supporting plates inline as will be understood by those skilled in the arts). The stethoscope is made from a springy wire and will snap into place in the matching mating holes in the trailer's coupler 145 with the spring pressure from opposite sides of the coupler providing enough inward pressure to hold it in place while still enabling the stethoscope to rotate in place in the matching mating holes. This ability to rotate in place will allow the trailer to pitch up and down (motion P in FIG. 18) without affecting the hitch angle measurement and without causing the stethoscope and wishbone pin to be dislodged. Pitch can occur when the vehicle and trailer travel over a rise or across a dip—the a movable joint provided by the stethoscope 180 connection enables the pin to correct for up and down motion about the hitch joint of the trailer relative to the vehicle. Rotation can occur when the vehicle and trailer travel over uneven surfaces (e.g., when the wheel of the trailer travels through a pot hole or when the vehicle and trailer cross the crown of a road)—the movable joint provided by the wishbone 181 connection enables the pin to correct for the trailer wheels not being level (i.e., on the same plane) relative to the leveling of the vehicle. The neck of the stethoscope 182 inserts into a tube 183 whereby the neck can rotate freely within the tube without excessive looseness or lash. This ability to rotate in place will allow the trailer to roll (motion R in FIG. 18) without affecting the hitch angle measurement and without causing the stethoscope and wishbone pin to be dislodged. The wishbone piece comprises the tube 183 and two legs. These two legs hold their opened position due to the springiness of the wire, but enable a user to pinch the two legs together such that the two feet can be inserted into mounting holes 176 (in connector mounts 175 as shown in FIG. 15) in the toothed ring 163 and when the pinch is released, the two feet will engage mounting holes 176 in either ends of connector mounts 175 in the toothed ring 163 with enough outward pressure to hold the wishbone in place. Even though only one set of connector mounts 175 with its mounting holes 176 is shown in FIG. 15 for simplicity, multiple sets of can be provided, including being repeatedly located all the way around toothed ring 163. The stethoscope 180 can be formed from a single piece of wire where the neck portion 182 is formed first by bending (at its center) the wire back against itself and then parting the two ends out and around the coupler. The wishbone 181 can also be formed from a single piece of the same or similar type of wire by first coiling the middle portion of the wire to form the tube portion 183 and then bending the wire down and apart to form the two legs. By fabricating the stethoscope 180 and wishbone 181 pin in this way, the cost of this component can be kept very low, making replacement if lost very affordable. The hitch angle motion being measured is sometimes also referred to as "yaw" (motion Y in FIG. 18).

Straight line hitch angle (i.e., hitch angle equals zero degrees) detection sensing can optionally be included with any of the variations of the present invention described above or to be anticipated in the future. In either the triangle or parallelogram implementation of the present invention, an optical or pressure sensor (e.g., a leaf switch) could sense the point of the connection arm 102 opposite the connection point 105 to detect when the sensor arm is being pulled straight out in-line with the centerline of the vehicle (i.e., along line x). In the circular ring implementation, a notch in the ring opposite to the point where the ring is attached to the trailer tongue could be optically sensed.

The hitch sensor, being that it is installed in or on the hitch ball mount or within an adaptor plate, can be installed or removed from a vehicle by hand without requiring the use of tools by installing or removing the hitch ball mount (with the hitch sensor integral thereto) from the hitch receiver on the vehicle (and attaching or detaching the electrical connector for power, and in some cases also for angle data, from the vehicle's wiring harness).

Display Device

Figure 19:
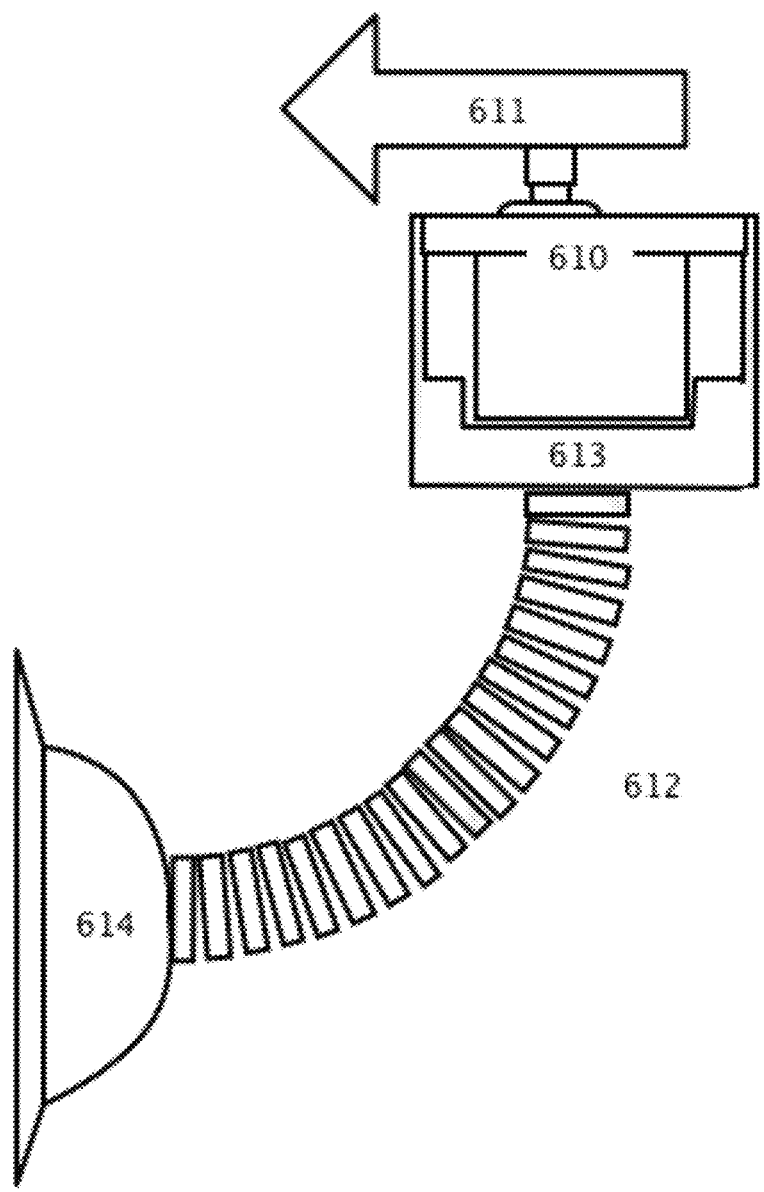
FIG. 19 depicts a mechanical display device to indicate a trailer's intended or expected direction in accordance with various embodiments of the invention.

FIG. 19 depicts a mechanical display device to indicate a trailer's intended or expected direction in accordance with various embodiments of the invention. Pointer 611 in the shape of an arrow or some other directional indicator is mounted on servo 610. Servo 610 is mounted in case 613 along with a microprocessor having communications capability such as a Bluetooth module, a hardwired serial RS-232 link, or other wired or wireless communications capability. Case 613 is then attached to mounting means 614 by way of a flexible gooseneck 612 (which can be shaped with manual force but which otherwise holds that shape). Other adjustable mounting means that enable positioning (direction, levelness, and the like) of pointer 611 can be used in place of gooseneck 612. Mounting means 614 could incorporate a suction cup (for attachment to a smooth surface), a magnet strong enough to support the display device (for attachment to an iron containing surface, such as the underside of the vehicle's roof in the passenger compartment), screw holes (for permanent attachment to a surface with screws), or any of a number of other attachment means. Some mounting positions may not require positioning enablement if its orientation is known, as would be the case for a magnetic mount for the passenger area ceiling. It must be noted that if the display device is mounted in such a way that servo 610 is inverted such that the pointer 611 is hanging below servo 610 (as would likely be the case if magnetically mounted on the passenger area ceiling), the angle signal must be reversed to provide proper direction of the pointer 611 (e.g., a servo waveform signal duty cycle of 10% becomes 90% and 90% becomes 10%). Also inside case 613 (but not shown in the figure) can be a battery such as a 2032 button battery, a AA or a AAA battery, or any other power providing means (including wires that pass through the case and/or through the gooseneck for a wired power source connection to the vehicle). If a wired communications capability is used (such as RS-232), the wires for this communications means can likewise pass through the case and/or through the gooseneck for a wired communications connection.

Figure 20:
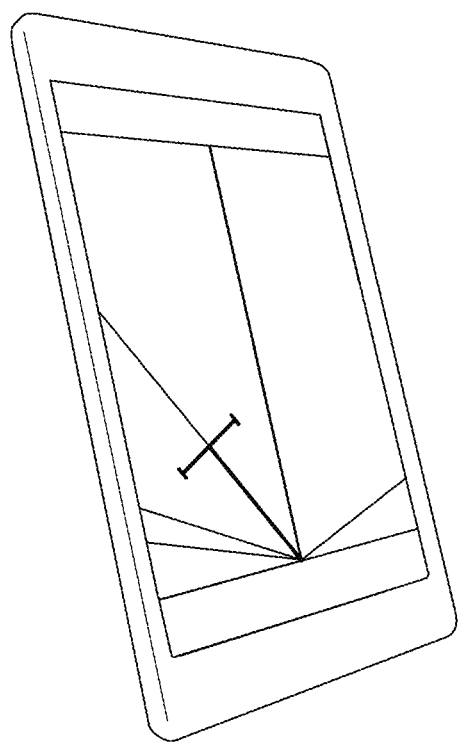
FIG. 20 depicts a commercial display device such as an LCD display, a smart phone or a tablet type device for use as the display device.

Other display devices can be used for indicating the trailer direction including a video screen for displaying the output of a rearwardly facing camera; this camera can be mounted on the vehicle or on the trailer. The display device (FIG. 20) could be a commercial display device such as an LCD display, or it could be a smart phone or a tablet type device. The display device would have wireless or wired communications capability such that it can communicate with one or more of the sensors.

Trailer type can contribute to the display device type selection. Smaller and/or lower trailers (lower including any trailer contents) can preferably utilize either the mechanical directional indicator as described above or a video display device, but larger or taller trailers that may block the operator's view might preferably utilize a video display device mounted on the back of the trailer. A video display device can either superimpose a line to indicate the trailer's intended direction or a curve to indicate the trailer's intended direction as well as the full path for getting there. Alternatively, the video camera could be mounted on the servo in the place of the pointer 611 (with the servo operated as described above for the pointer 611, except for adjusting the pointing direction for the amount of turning contributed by the trailer angled away from the vehicle's centerline, i.e., the hitch angle) such that the camera view is moved by the servo and the video image generally will be kept centered on the trailer's intended destination. In operation, servo positioning commands are sent to the servo via the communications means to command the pointer to rotate by a number of degrees as determined by the system as a result of running a direction algorithm.

The display device can be installed or removed from a vehicle by hand without requiring the use of tools by attaching or detaching the display mount to or from the vehicle and plugging in or unplugging the electrical connector for power (and in some cases also for angle data from the hitch sensor if it is wired).

Computational Engine

At this point it is necessary to understand the possible places where the direction algorithm will be determined. The direction algorithm can be determined by calculation (as in the '953 patent), by table look up (as in the '169 patent application), or by a combination of calculation and table look up. However, where the calculation is determined impacts the configuration of the system. In practice, there are at least three devices (the hitch angle sensor, the steering sensor and the direction indicator) and these devices will each be positioned in a different place about the vehicle and trailer combination. Any one of these three devices can be utilized to determine the direction algorithm. If the direction algorithm is determined by the direction indicator, then the hitch angle data and the steering data (whether raw, converted to turning radius, or in some other form) must be communicated to the direction indicator's microcomputer. If the direction algorithm is determined by the hitch angle sensor, then the steering data (whether raw, converted to turning radius, or in some other form) must be communicated to the hitch angle sensor's microcomputer, and the hitch angle sensor's microcomputer's determination of the direction algorithm must be communicated to the direction indicator. Alternatively, a fourth device can be added to the system to be utilized to determine the direction algorithm, in which case the hitch angle data and the steering data (whether raw, converted to turning radius, or in some other form) must be communicated to the fourth device and the fourth device's determination of the direction algorithm must be communicated to the direction indicator. Such a configuration utilizing four devices may be found, for example, where the microcomputers in the hitch angle sensor, the steering sensor and the direction indicator are all low power microcomputers lacking the capability to run the direction algorithm, thereby requiring a fourth device to add this capability. Such a configuration utilizing four devices may also be found if the fourth device is a smart phone. Alternatively, with two sensors—one to measure steering and one to measure the hitch angle—and a smart phone, the system could be implemented by having the two sensors communicate together (either directly or by passing communications through the smart phone) such that the backing algorithms could be implemented in one or both or divided between the two sensors with the smart phone performing the display functions. Another alternative would have a smart phone perform the display functions and all or most of the backing algorithms, communicating with a steer sensor and a hitch angle sensor for data (but, each sensor could perform some portion of the calculations, e.g., the steer sensor could perform some of the IMU calculations). When a smart phone is used (or a tablet or other device, typically running an operating system such as iOS™, Android™, or some other operating system) an app would be downloaded to that device to provide the displaying and/or computational functionality.

As is the case with the disclosure of devices of the present nature, many variations will subsequently come to the minds of those skilled in the art. For example, just to name a few without limiting the potential variations to these few listed: the sensor type employed to determine steering wheel's rotational position could be (a) the rotation sensor as described herein, (b) an accelerometer sensor to algorithmically replace the pendulum by directly sensing and measuring the gravitational component, (c) a gyroscope (including an integrated MEMS type gyroscope), or (d) an inertial measurement unit (IMU) as described herein; rather than utilize the steering wheel, the steering sensor could be attachable and removable to any component of the steering linkages or systems whose motion corresponds to or that could be used to identify the position of the front wheels or their turning angle; rather than be attachable and removable, the steering wheel sensor could be integrated within or upon the steering wheel (or within or upon any component of the steering linkages or systems whose motion corresponds to the motion of the steering wheel of the vehicle or that could be used to identify the position of the front wheels or their turning angle); instead of a power switch, a power-up push button could be used to activate the circuitry of the device and the device could power itself off after (i) a time interval or (ii) a period of non-activity or (iii) when commanded to power down by some other part of the system, among other possibilities; power for the steering sensor device could be drawn from the electronic harness within the steering wheel (and/or steering column) instead of incorporating a battery; battery power for any of the sensors could be provided by a single battery or a set of batteries that are rechargeable or disposable; the steering wheel position derived data could be sent over a wired connection through the steering wheel (and/or steering column) instead of incorporating wireless communications circuitry; the steering wheel sensor's means of transmitting steering data can be optical where an LED could send modulated serial data to one or more optical demodulating serial receivers mounted in one or more locations about the steering column; any of the components having wireless communications could incorporate either individual wireless communications components or a wireless enabled microprocessor (such as the nRF51822 by Nordic Semiconductor which incorporates radio circuitry capable of implementing the Bluetooth and Gazell wireless communications protocols or other wireless communications protocols); the trailer direction pointing device could be (I) the servo based pointer described herein, (II) a video display showing the rearward view whereby said view could pan left and right to indicate the trailer direction by keeping said view centered about the trailer's path as described herein, (III) a video display showing the rearward view with a superimposed indication of the trailer's path, (IV) a smart phone with an app that uses the smart phone display to show either the backup camera image as described above, or an onscreen pointer (the smart phone and app could be positioned such that the on-screen pointer direction would be correct, or the smart phone and app would have to utilize the smart phone's internal compass direction finder subsystem —as is available in Apple's iPhone™—to compensate for the phone's orientation and to adjust the on-screen pointer accordingly).

As those skilled in the art of control systems will recognize, the present invention could be used as an integral part of a feedback loop in a vehicle having electronic steering or motor controlled steering capability. As vehicles so equipped have their internal data inputs and control functions become accessible to third party devices through such systems as Apple's CarPlay™ technology or Ford's Sync™ technology, the present invention will be applicable to such vehicles. In these cases, the portable steer sensor could be used as described herein, or steering data (front wheels angle or turning radius) could be queried directly from the vehicle. With such an interface to the vehicle, a pointer could be used by the driver (as disclosed in the '953 patent) to indicate where he or she desired for the trailer to go and the present invention would be used to determine the difference between the current steering and the steering that will bring about the desired trailer direction prediction as indicated by the driver operated pointer (given the current hitch angle). This is accomplished by adapting the direction algorithm by calculation (as in the '953 patent), by table look up (as in the '169 patent application), or by a combination of calculation and table look up. For example, if by table look up (as in the '169 patent application), the table (see FIG. 16 in the '169 patent application, although a higher precision table of floating point values would be preferable) would be used to look up a value for a desired turning radius by looking across the row corresponding to the current hitch angle value to locate the entry corresponding to the desired change in direction for the vehicle (i.e., the angle measured on the driver operated pointer) to identify the column corresponding to the desired turning radius for the vehicle. Once a determination of the steering that will bring about the desired trailer direction prediction as indicated by the driver operated pointer is made, the desired steering values would be fed back into the vehicle's data interface to effect that steering, or in the absence of a system providing access to the vehicle's internal data inputs and control functions, the desired steering values would be fed directly to the servo-mechanism system to effect an adjustment to the steering of the vehicle (as disclosed in the '953 patent). For such operations, the driver could be responsible for operating the accelerator and break, or in so much as self-driving vehicles are becoming available through such companies as Google, the additional commands for speed and breaking could be incorporated.

The terms and expressions employed herein are used as terms and expressions of description and not of limitation, and there is no intention, in the use of such terms and expressions, of excluding any equivalents of the features shown and described or portions thereof. In addition, having described certain embodiments of the invention, it will be apparent to those of ordinary skill in the art that other embodiments incorporating the concepts disclosed herein may be used without departing from the spirit and scope of the invention. Accordingly, the described embodiments are to be considered in all respects as only illustrative and not restrictive.

I claim:

1. A system for aiding an operator of a vehicle connected to a trailer with backing up the trailer that is suitable as a customer installed, aftermarket system comprising:
    a sensor to measure a rotation of a steering wheel;
    an attaching mechanism to attach the sensor to the steering wheel, the attaching mechanism selected from a group consisting of: straps Velcro®, flexible plastic, a steering wheel cover, a gripping device comprising a first point of contact to the steering wheel and a second opposing point of contact to the steering wheel, and an attaching mechanism that can be installed or removed using only one's hands;
    an angle sensor to measure an angle formed by a connection between the vehicle and the trailer; and
    a computing device to determine a prediction of a portion of a path that the trailer will follow while backing, wherein the sensor to measure the rotation of the steering wheel and the angle sensor to measure the angle formed by the connection between the vehicle and the trailer are not integrated within the vehicle.

2. The system of claim 1, further comprising: wireless communications circuitry to communicate steering information about the vehicle to other parts of the system.

3. The system of claim 1, further comprising: a power source not wired to the vehicle.

4. The system of claim 3, further comprising: one or more batteries, wherein the one or more batteries are either rechargeable or disposable.

5. The system of claim 1, further comprising: one or more devices selected from a group consisting of: a pendulum, a rotation sensor, an accelerometer, a gyroscope, and an IMU.

6. The system of claim 1, wherein the sensor to measure the rotation of the steering wheel further comprises: a surface that when placed across the steering wheel will self-align the sensor to be in the plane of the steering wheel.

7. The system of claim 1, further comprising: an attachment mechanism to attach the sensor to measure the angle formed by the connection between the vehicle and the trailer to the vehicle proximate to a hitch ball.

8. The system of claim 7, further comprising: a stretchable or flexible cord-like device between a first cord mounting point and a second cord mounting point, wherein the first cord mounting point is on the vehicle end of the flexible cord-like device and the second cord mounting point is on the trailer end of the flexible cord-like device.

9. The system of claim 8, wherein the connection between the vehicle and the trailer comprises: an axis of rotation, and
    wherein the first cord mounting point is located at a first distance from the axis of rotation and the second cord mounting point is located at a second distance from the axis of rotation.

10. The system of claim 9, wherein the first distance is equal to the second distance.

11. The system of claim 7, further comprising: a movable joint to correct for up-and-down motion or pitch of the wheels of the trailer relative to the vehicle.

12. The system of claim 7, further comprising: a movable joint to correct side-to-side motion or rotation for the trailer wheels not being level relative to the leveling of the vehicle.

13. The system of claim 7, further comprising: a wireless connection for communicating information about the connection between the vehicle and the trailer.

14. The system of claim 13, further comprising: one or more of a Bluetooth® communications link, a Wi-Fi™ communications link, a ZigBee™ communications link, or an RS-232 communications link.

15. The system of claim 1, further comprising: displaying the prediction through one or more devices selected from a group consisting of: an LCD display, a smart phone, a tablet, a lap-top computer, a back-up camera's screen, a device running the iOS™ operating system, and a device running the Android™ operating system.

16. The system of claim 1, further comprising: a button to do one or more of (i) powering-on the sensor, and (ii) providing a user input.

* * * * *